(12) United States Patent
Sullivan

(10) Patent No.: US 10,538,151 B2
(45) Date of Patent: Jan. 21, 2020

(54) SYSTEMS AND METHODS RELATED TO CARGO ENCLOSURES

(71) Applicant: Michael J. Sullivan, Oconomowoc, WI (US)

(72) Inventor: Michael J. Sullivan, Oconomowoc, WI (US)

(73) Assignee: Fox Products, LLC, Oconomowoc, WI (US)

( * ) Notice: Subject to any disclaimer, the term of this patent is extended or adjusted under 35 U.S.C. 154(b) by 0 days.

(21) Appl. No.: 16/513,811

(22) Filed: Jul. 17, 2019

(65) Prior Publication Data

US 2019/0359041 A1 Nov. 28, 2019

Related U.S. Application Data

(63) Continuation-in-part of application No. 15/980,660, filed on May 15, 2018, which is a continuation-in-part of application No. 15/850,449, filed on Dec. 21, 2017, now Pat. No. 10,183,560, which is a continuation of
(Continued)

(51) Int. Cl.
| | |
|---|---|
| *B60J 7/16* | (2006.01) |
| *B60J 7/12* | (2006.01) |
| *B60J 7/185* | (2006.01) |
| *B60R 9/00* | (2006.01) |
| *B60J 7/19* | (2006.01) |
| *B60J 7/08* | (2006.01) |
| *B62D 33/04* | (2006.01) |

(52) U.S. Cl.
CPC ........... *B60J 7/12* (2013.01); *B60J 7/085* (2013.01); *B60J 7/1614* (2013.01); *B60J 7/185* (2013.01); *B60J 7/198* (2013.01); *B60R 9/00* (2013.01); *B62D 33/04* (2013.01)

(58) Field of Classification Search
CPC ... B60J 7/12; B60J 7/085; B60J 7/1614; B60J 7/185; B60J 7/198; B60R 9/00
USPC ............................... 296/26.04, 26.06, 26.07
See application file for complete search history.

(56) References Cited

U.S. PATENT DOCUMENTS 3,765,716 A * 10/1973 Van Gompel .......... B60J 7/1614
296/100.08
4,284,303 A 8/1981 Hather
(Continued)

OTHER PUBLICATIONS

USPTO Non-Final Office Action for U.S. Appl. No. 15/602,191, dated Aug. 2, 2017, 7 pages.
(Continued)

*Primary Examiner* — Joseph D. Pape
(74) *Attorney, Agent, or Firm* — Smith Keane LLP

(57) ABSTRACT

Systems and methods related to cargo enclosures feature side frame assemblies securable to a pickup truck cargo box or similar structure. The frame assemblies include longitudinal channels that are movable from a closed position to an extended position by an actuator mechanism. The actuator mechanism includes oppositely disposed linear actuators anchored to one of the channels, forcing hinged rails from an overlapping relationship to a coaxial relationship. The frame assembly may include a cross- or scissor-brace to improve stability. A pliable fabric forms at least one and up to three panel sidewalls that extend and retract simultaneously with the movement of the channels. A top cover is selectively securable to the frame assemblies.

15 Claims, 38 Drawing Sheets

Related U.S. Application Data application No. 15/602,191, filed on May 23, 2017, now Pat. No. 9,849,763.

(56) References Cited

U.S. PATENT DOCUMENTS

| | | | |
|---|---|---|---|
| 4,981,319 A * | 1/1991 | Gerzeny | B60J 7/165 |
| | | | 296/165 |
| 5,078,441 A * | 1/1992 | Borskey | B60J 7/165 |
| | | | 292/DIG. 72 |
| 5,238,288 A | 8/1993 | Chandler | |
| 5,366,266 A * | 11/1994 | Harbison | B60J 7/1614 |
| | | | 16/364 |
| 5,516,182 A | 5/1996 | Aragon et al. | |
| 5,758,921 A | 6/1998 | Hall | |
| 6,325,447 B1 * | 12/2001 | Kuo | B60P 3/341 |
| | | | 296/160 |
| 6,830,281 B2 | 12/2004 | Hoffman | |
| 7,118,159 B1 | 10/2006 | Andrews | |
| 7,118,165 B2 * | 10/2006 | Nelson | B62D 33/0276 |
| | | | 296/186.2 |
| 7,147,265 B1 | 12/2006 | Schmeichel | |
| 7,226,108 B2 | 6/2007 | Altman | |
| 7,419,207 B2 | 9/2008 | Klein | |
| 7,735,898 B1 | 6/2010 | Bridges | |
| 7,758,103 B1 | 7/2010 | Steury et al. | |
| 7,959,200 B2 | 6/2011 | Voglmayr | |
| 8,186,739 B2 | 5/2012 | Bruestle et al. | |
| 8,308,218 B2 | 11/2012 | Kneifl et al. | |
| 8,684,439 B1 | 4/2014 | Calvert | |
| 9,475,371 B2 | 10/2016 | LaBiche | |
| 10,046,628 B1 * | 8/2018 | Fulton | B60J 7/067 |
| 2005/0093339 A1 | 5/2005 | Klassen | |
| 2006/0017303 A1 | 1/2006 | Weege et al. | |
| 2008/0174142 A1 * | 7/2008 | Pearlman | B60J 7/1607 |
| | | | 296/100.1 |
| 2009/0189403 A1 * | 7/2009 | Voglmayr | B60P 1/02 |
| | | | 296/3 |
| 2011/0309651 A1 * | 12/2011 | Hernandez | B60J 7/1621 |
| | | | 296/100.08 |
| 2016/0243975 A1 | 8/2016 | Singer | |
| 2016/0280051 A1 | 9/2016 | Singer | |

OTHER PUBLICATIONS

USPTO Non-Final Office Action for U.S. Appl. No. 15/850,449, dated Aug. 23, 2018, 6 pages.
USPTO Non-Final Office Action for U.S. Appl. No. 15/980,660, dated Feb. 15, 2019, 15 pages.

* cited by examiner

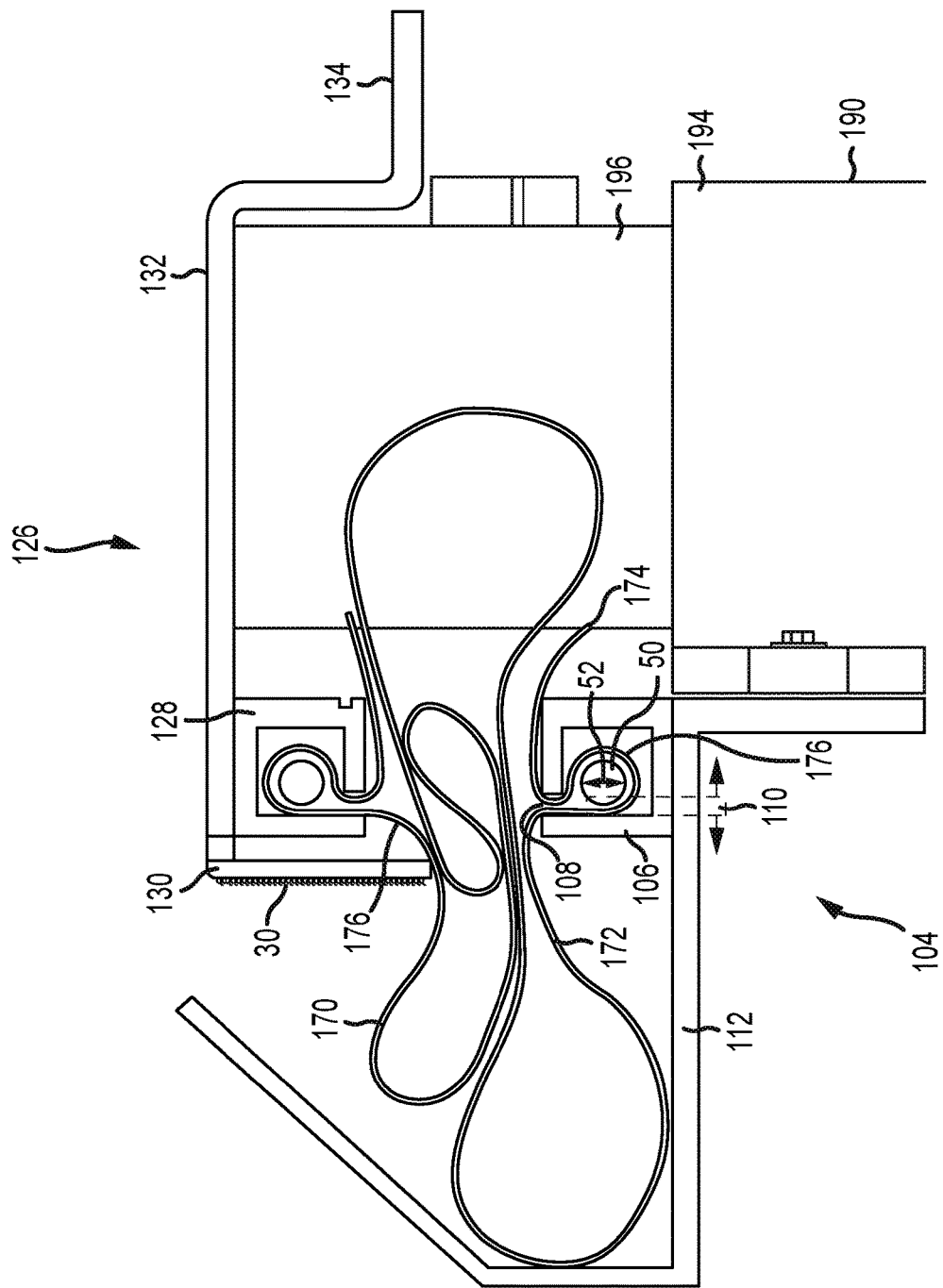

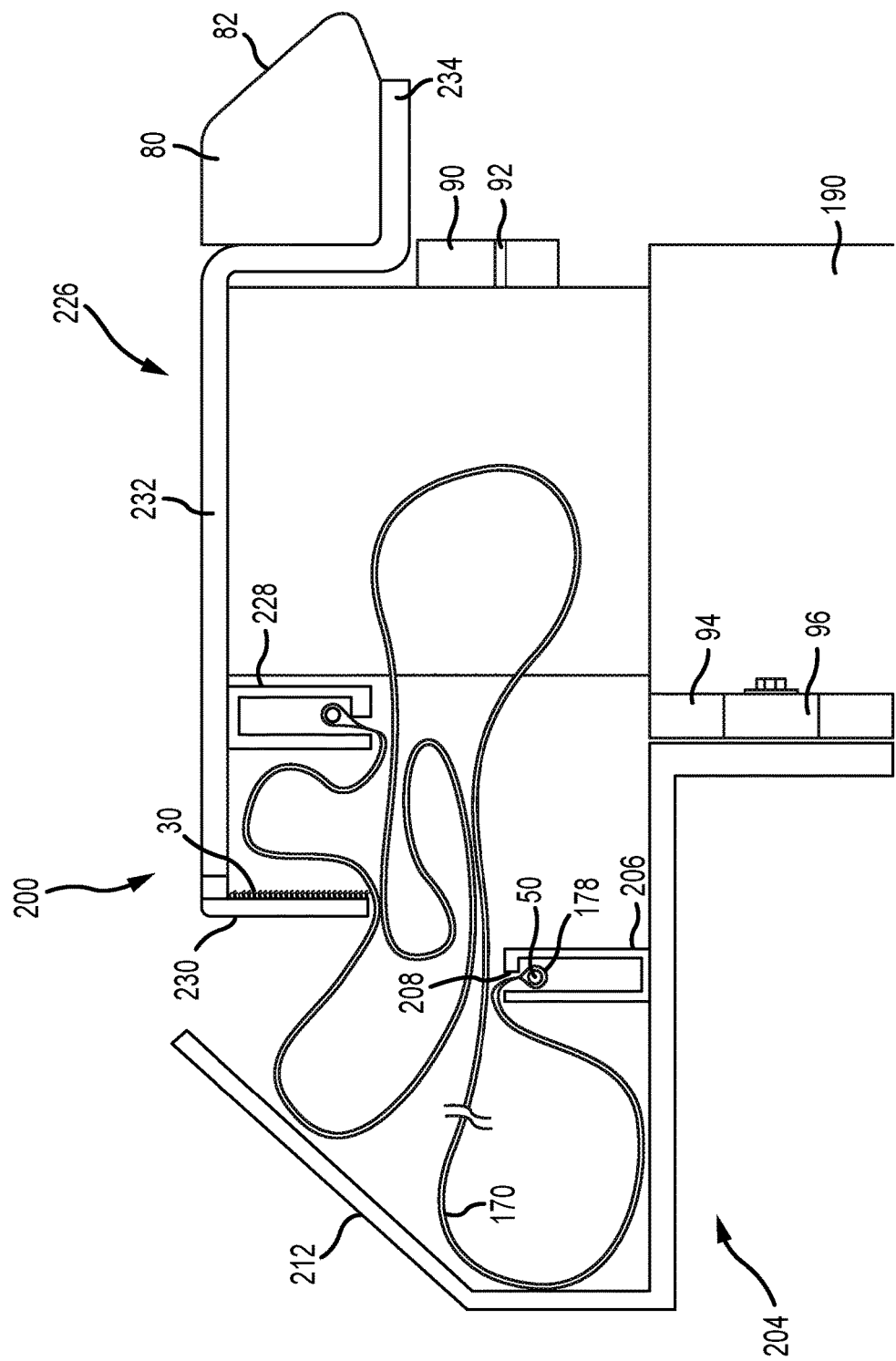

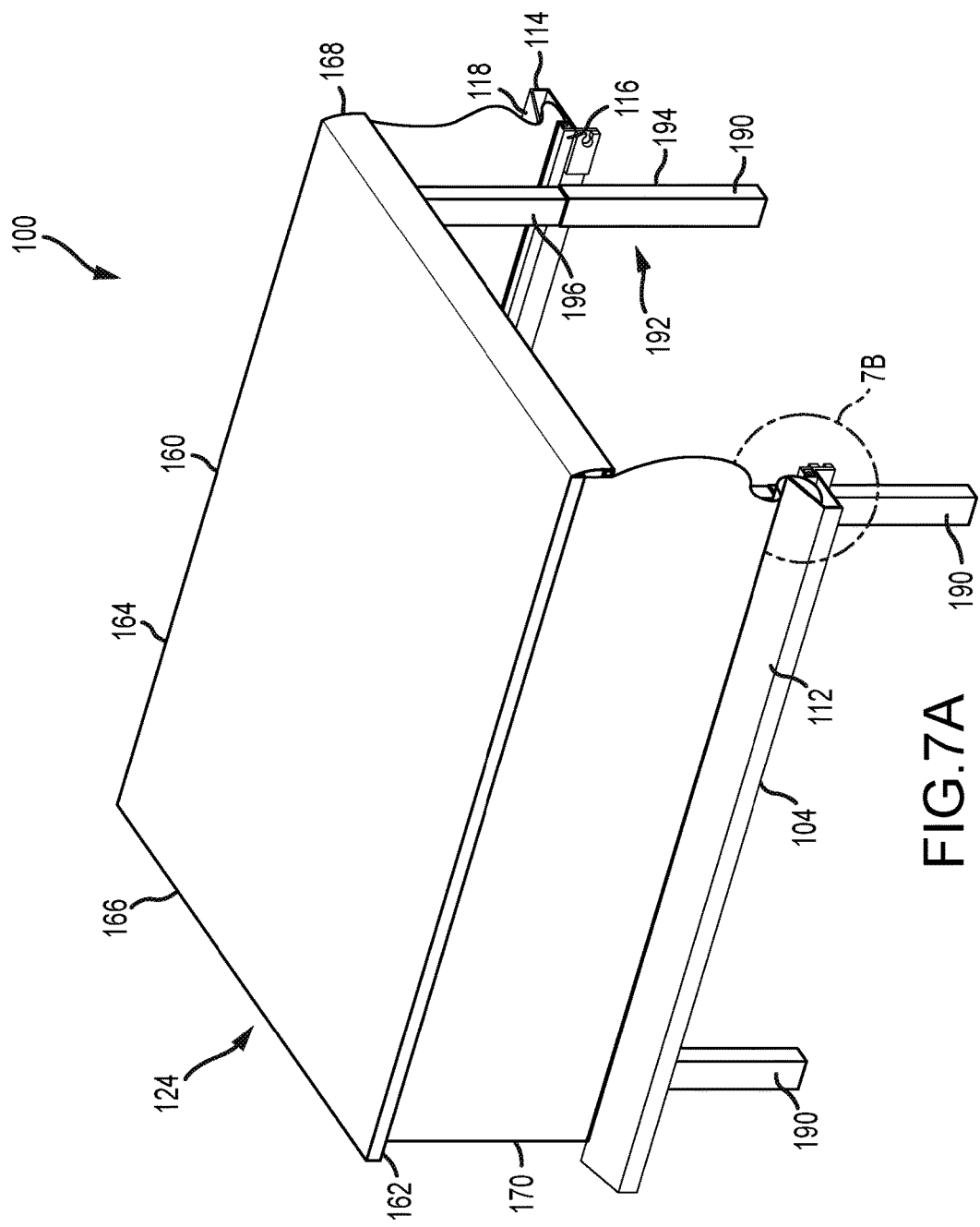

SYSTEMS AND METHODS RELATED TO CARGO ENCLOSURES

RELATED APPLICATIONS

This application is a continuation-in-part of co-pending U.S. patent application Ser. No. 15/980,660, filed 15 May 2018, titled, "Systems and Methods for a Truck Box Cover," which is a continuation-in-part of U.S. patent application Ser. No. 15/850,449, filed 21 Dec. 2017, titled, "Systems and Methods for a Truck Box Cover," which is a continuation of issued U.S. Pat. No. 9,849,763, filed 23 May 2017, titled, "Systems and Methods for a Truck Box Cover," all of which are incorporated herein by reference in their entireties.

BACKGROUND OF THE INVENTION

Pick-up trucks are typically produced with a cargo box having an open design with a tailgate which may be lowered or opened in some manner to allow access to the cargo box. Presently, there are many options and styles provided through the aftermarket to cover the open box to keep contents placed in the box out of the weather, more secure, or just to provide a more pleasing aesthetic. Varieties of box covers include both soft and hard tonneau covers and paneled tonneau covers which extend across the top of the box at the height of the box rails, and caps (or toppers) which sit on top of the box rails and extend over the box at a height of at least the height of the truck cab. Although some soft and paneled covers offer the ability to roll or remove the cover material entirely, the intended utility of the cover is typically limited to the dimensions defined by the cover itself.

Therefore, there is a need for a box cover that can transform to suit multiple load types and still protect the load from outside elements.

SUMMARY OF THE INVENTION

Embodiments according to the present invention relate to an improved cargo enclosure. An embodiment of a cargo enclosure system according to the present invention includes two longitudinal frame assemblies. Each frame assembly includes first and second longitudinal channels having substantially aligned open longitudinal sides. A first hinged rail is disposed proximate a first end of the first and second longitudinal channels, and a second hinged rail disposed proximate a second end of the first and second longitudinal channels. Each hinged rail preferably includes a lower leg and an upper leg. The lower leg extends from a first end portion rotatably coupled to the first channel and an opposite second end portion hingedly coupled to a first end portion of the upper leg. The upper leg includes an opposite second end portion rotatably coupled to the second channel. The system also includes an actuation mechanism, preferably on both frame assemblies, the actuation mechanism including a first linear actuator having an anchor end rotatably coupled with respect to the first channel and an extension end rotatably coupled with respect to the hinged coupling of the first hinged rail. The actuation mechanism further preferably includes a second linear actuator having an anchor end rotatably coupled with respect to the first channel and an extension end rotatably coupled with respect to the hinged coupling of the second hinged rail. The first and second linear actuators are preferably substantially contemporaneously retractable (the extension end moving towards the anchor end) to a first position and extendable (the extension end moving away from the anchor end) from the first position to a second position. When the actuators are in the first position, the first channel and second channel preferably form a chamber through their respective open sides. The chamber may serve to contain at least a majority of the first hinged rail and a majority of the second hinged rail. In such first position, the upper leg of each hinged rail preferably at least substantially overlaps the lower leg of each hinged rail. When the actuators are in the second position, the first channel is spaced further from the second channel than in the first position.

According to an aspect of an embodiment of a cargo enclosure system according to the present invention, when the actuators are in the second position, the upper leg and lower leg are preferably aligned in an at least substantially coaxial position.

According to another aspect of an embodiment of a cargo enclosure system according to the present invention, the lower leg of each hinged rail may include an actuator rod clearance notch formed in the second end of the lower leg.

According to still another aspect of an embodiment of a cargo enclosure system according to the present invention, the lower channel may have a U-shaped cross-section, the cross-section including an outer leg having a mounting ledge extending substantially perpendicular to the outer leg and along a majority of the length of the lower channel.

According to yet another aspect of an embodiment of a cargo enclosure system according to the present invention, the upper channel may have a U-shaped cross-section, the cross-section including an outer leg having a registration ledge extending perpendicular to the outer leg (e.g., perpendicular to a direction of travel of the upper channel) and along a majority of the length of the upper channel. The registration ledge may be anchored to the upper channel by fasteners or integrally formed with the upper channel, such as by extrusion.

According to a further aspect of an embodiment of a cargo enclosure system according to the present invention, each linear actuator anchor end is preferably rotatably coupled to a pair of bearing plates secured to the first channel.

According to a still further aspect of an embodiment of a cargo enclosure system according to the present invention, the system may further include a front frame assembly including a front registration rail secured to both of the two second longitudinal channels and a front mounting rail configured to be and/or secured to a front box rail of a pickup truck box. A top panel may also be included, having a top sheet material secured to the front registration rail. A plurality of support rods may be secured to a bottom face of the top sheet material, wherein the support rods are configured to span an entire distance between the two second longitudinal channels.

According to yet a further aspect of an embodiment of a cargo enclosure system according to the present invention, the system may include a first side panel coupled to and extending between the first channel and the second channel of one of the two frame assemblies. A second side panel may be coupled to and extend between the first channel and the second channel of the other of the two frame assemblies. A third side panel may be coupled to and extend between the first rail and the second rail of the front frame assembly. The first side panel, the second side panel, and the third side panel may form a continuous three-sided perimeter when the frame assemblies are in the extended position.

According to another aspect of an embodiment of a cargo enclosure system according to the present invention, wherein the first side panel, the second side panel, and the third side panel are formed from a contiguous sheet of material to provide seamless corners where the first and second side panels meet the third side panel. The material forming the panel(s) is preferably pliable and at least partially elastic.

BRIEF DESCRIPTION OF THE DRAWINGS

FIG. 5A is an end elevation view of a rail member and a cover member of the first embodiment system according to the present invention.

FIG. 5B is an end elevation view of a rail member and a cover member of a second embodiment system according to the present invention.

FIG. 7A is a rear perspective view of the first embodiment system shown in FIG. 6 according to the present invention.

DESCRIPTION OF THE PREFERRED EMBODIMENT

Although the disclosure hereof is detailed and exact to enable those skilled in the art to practice the invention, the physical embodiments herein disclosed merely exemplify the invention which may be embodied in other specific structures. While the preferred embodiment has been described, the details may be changed without departing from the invention, which is defined by the claims. It should also be noted that like part numbers represent like parts among the various embodiments.

Figure 1:
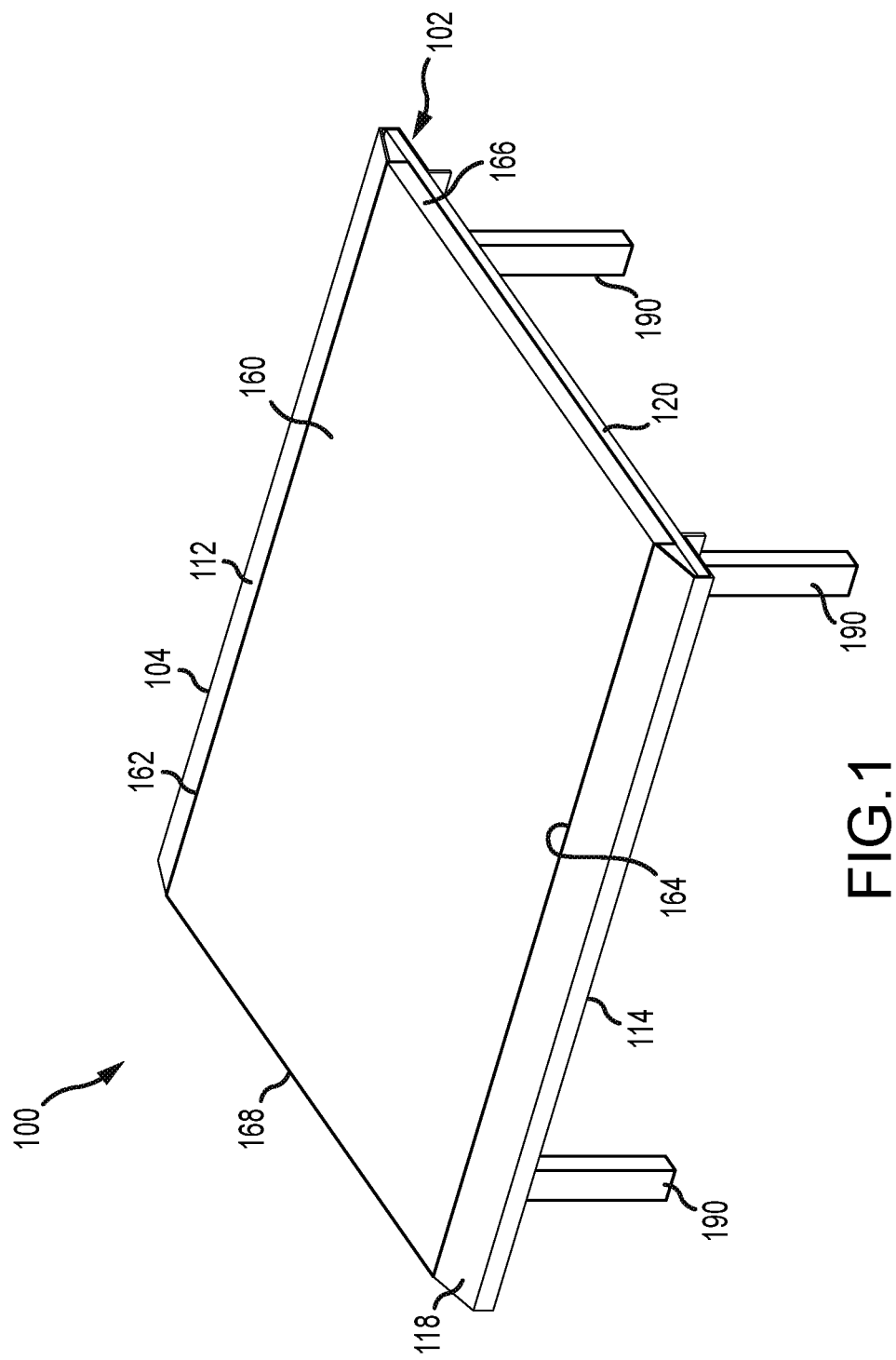
FIG. 1 is a front perspective view of first embodiment of a truck box cover system in a first position according to the present invention.
Figure 2:
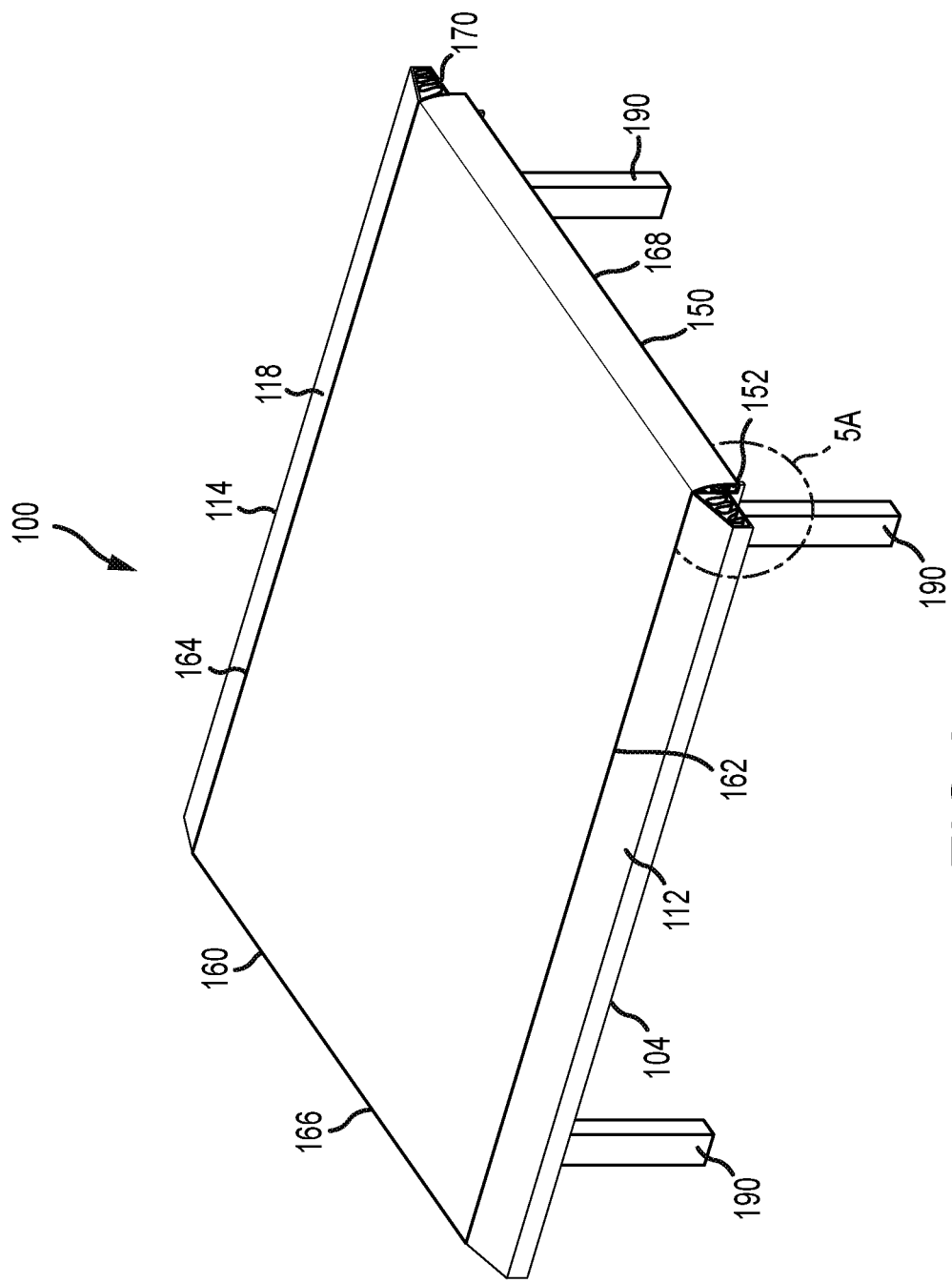
FIG. 2 is a rear perspective view of the first embodiment system in the first position according to the present invention.
Figure 3:
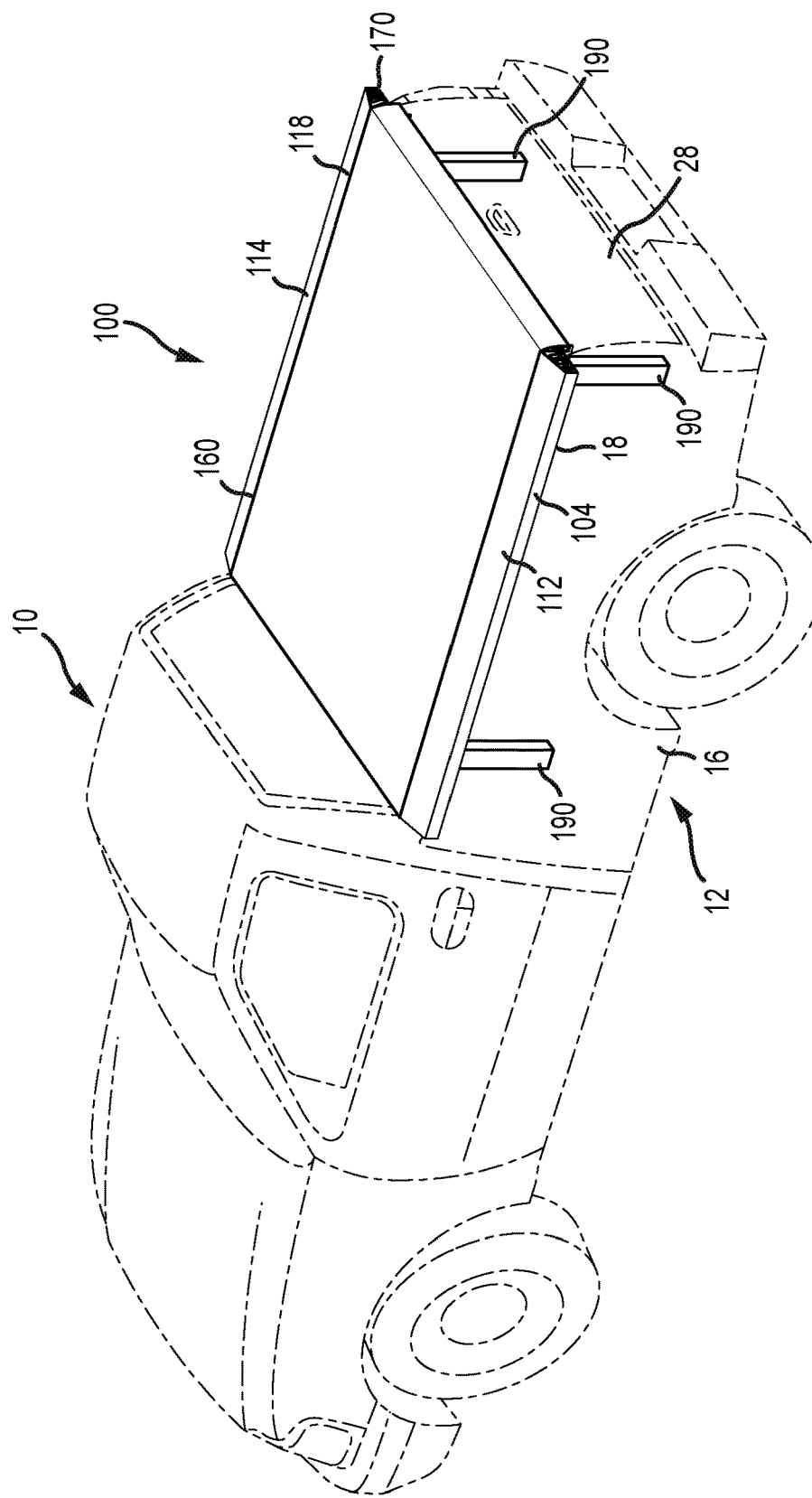
FIG. 3 is a perspective view of the first embodiment system in the first position installed in the box of a truck according to the present invention.
Figure 10:
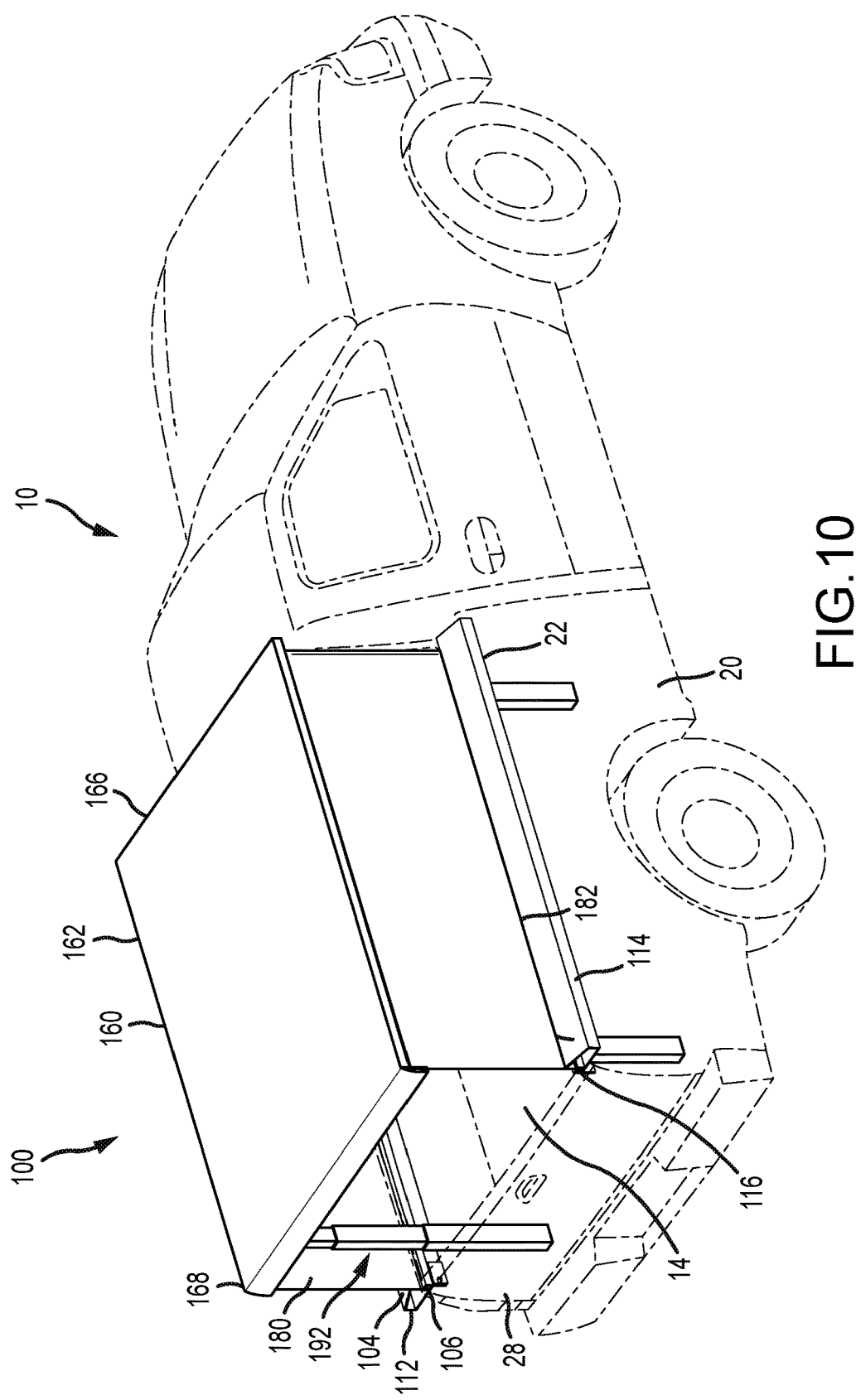
FIG. 10 is a rear perspective view of the first embodiment system in the second position installed in the box of the truck according to the present invention.

FIGS. 1-3 illustrate a first exemplary embodiment 100 of a truck box cover according to the present invention in a first position both independently and as installed in the box 12 of a truck 10. The box 12 of a truck 10 typically comprises a box floor 14, a first body panel 16 with a first box rail 18, a second body panel 20 with a second box rail 22, a box end panel 24 with a third box rail 26, and a tailgate 28 (see also FIGS. 10 and 11).

The truck box cover system 100 according to an exemplary first embodiment of the present invention preferably comprises a first frame 102; a second frame 124; a top 160 preferably comprising a first compliant material; a second compliant material 170 (see also FIG. 6), a rear panel 70, and a plurality of columns 190.

The first frame 102 preferably comprises a first rail member 104, a second rail member 114, and a third rail member 120. The first, second, and third rail members 104,114,120 are configured to follow the shape of the truck box 12, specifically the first, second, and third box rails 18,22,26, respectively.

The first, second, and third rail members 104,114,120 are preferably configured to be set upon the first, second, and third box rails 18,22,26 of the box 12, respectively. Securing at least the first and second rail members 104,114, to the first and second box rails 18,22 may be accomplished by clamping, bolting, and/or any other method now known or later developed.

Looking at FIG. 5A the first rail member 104 is shown in more detail. Preferably, the first rail member 104 comprises a first rail member retainer 106 and a first rail member enclosure 112. Similarly, but not shown in this figure, the second rail member 114 preferably comprises a second rail member retainer 116 and a second rail member enclosure 118. As discussed further below, the first and second rail member retainers 106,116 are configured to retain a first end portion 172 of the second compliant member 170, and the first and second rail member enclosures 112,118 are configured to house at least a portion of the second compliant material 170 when the truck box cover system 100 is in the first position (see FIG. 5).

Looking back to FIG. 1, the third rail member 120 is shown preferably comprising a third rail member retainer 122, similar to the first and second rail member retainers 106, 116. The third rail member 120 extends between the first and second rail members 104,114 and is configured to retain the first end portion 172 of the second compliant member 170.

Figure 6:
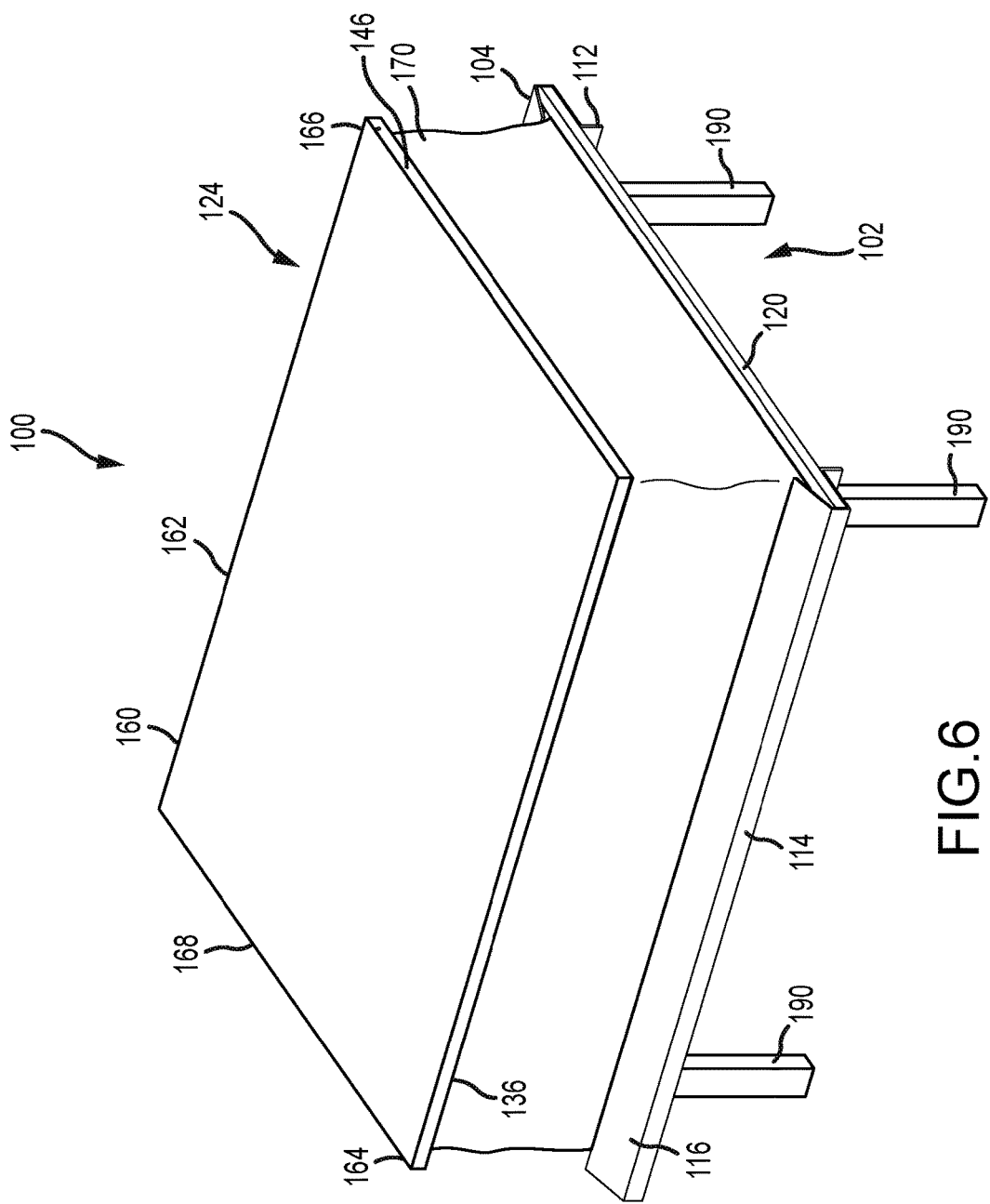
FIG. 6 is a front perspective view of the first embodiment system transitioning between the first position and a second position according to the present invention.

The second frame 124 is more easily seen in FIGS. 6 and 7A. The second frame 124 preferably comprises a first cover member 126, a second cover member 136, a third cover member 146, and a fourth cover member 150 (see FIG. 4B). Looking to FIG. 5A for a more detailed view, the first cover member 126 is shown preferably comprising a first cover member retainer 128, a first cover member flange 130, and a first cover member plate 132 extending inward from the first cover member retainer 128. Hook-and-loop fastener material 30 is preferably provided along the first cover member flange 130. The first cover member plate 132 preferably has a shelf 134 extending the length thereof and a first cam member 80 with a surface 82 is preferably provided thereupon. The first cover member retainer 128 is preferably configured to retain a second end portion 176 of the second compliant member 170.

Figure 13:
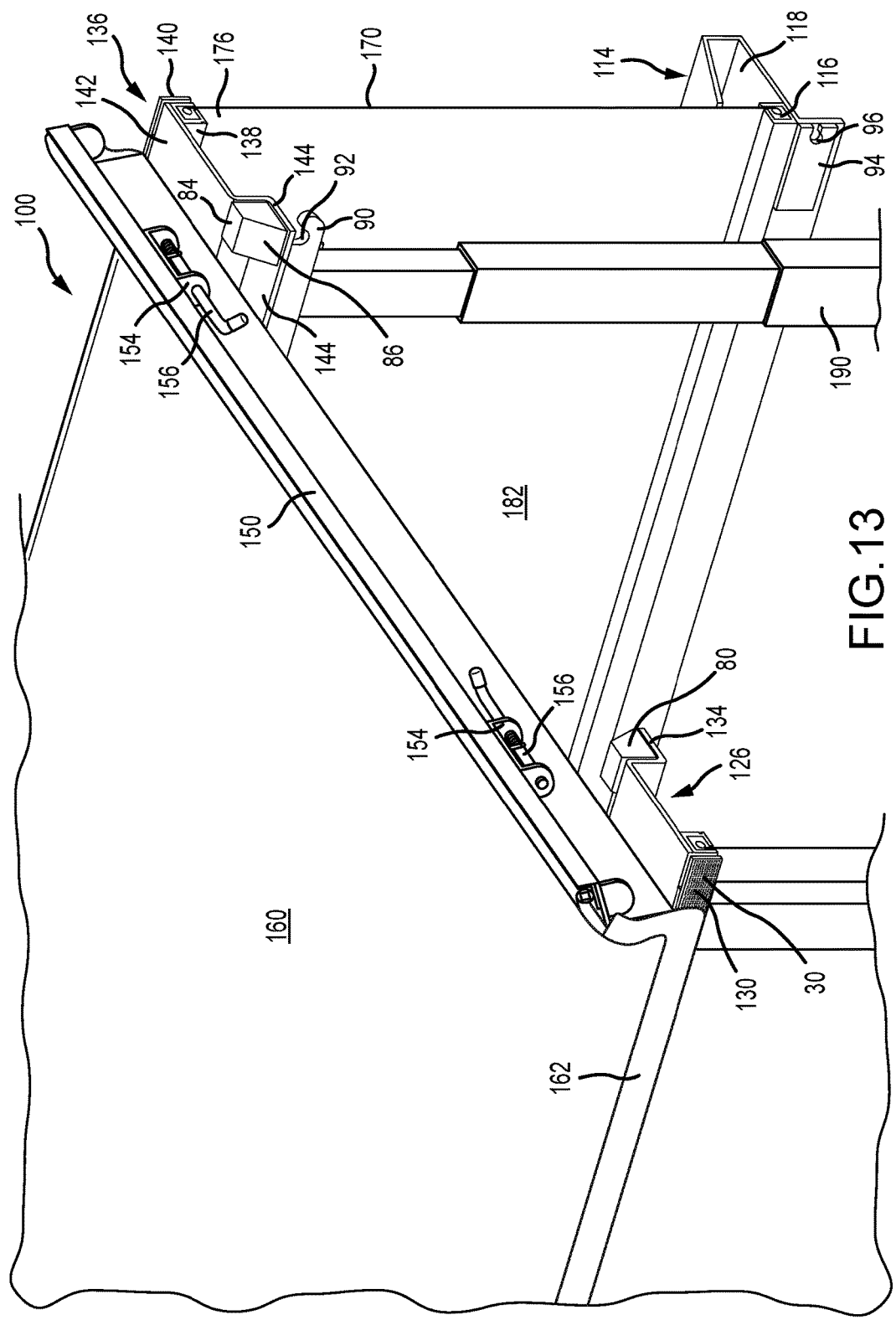
FIG. 13 is a partial rear perspective view of the first embodiment system according to the present invention.

As shown in FIG. 13, the second cover member 136 is similar to the first cover member 126 and comprises a second cover member retainer 138, a second cover member flange 140, and a second cover member plate 142 extending inward from the second cover member retainer 138. Hook-and-loop fastener material 30 is preferably provided along the second cover member flange 140 (see FIG. 14). The second cover member plate 142 preferably has a shelf 144 and a second cam member 82 with a surface 84 is preferably provided thereupon. The second cover member retainer 138 is preferably configured to retain the second end portion 176 of the second compliant member 170.

The third cover member 146 preferably comprises a third cover member retainer 148 and extends between the first and second cover members 126,136. The third cover member 146 is configured to retain the second end portion 176 of the second compliant member 170 and a third side 166 of the first compliant member 160 (discussed further below).

Figure 4A:
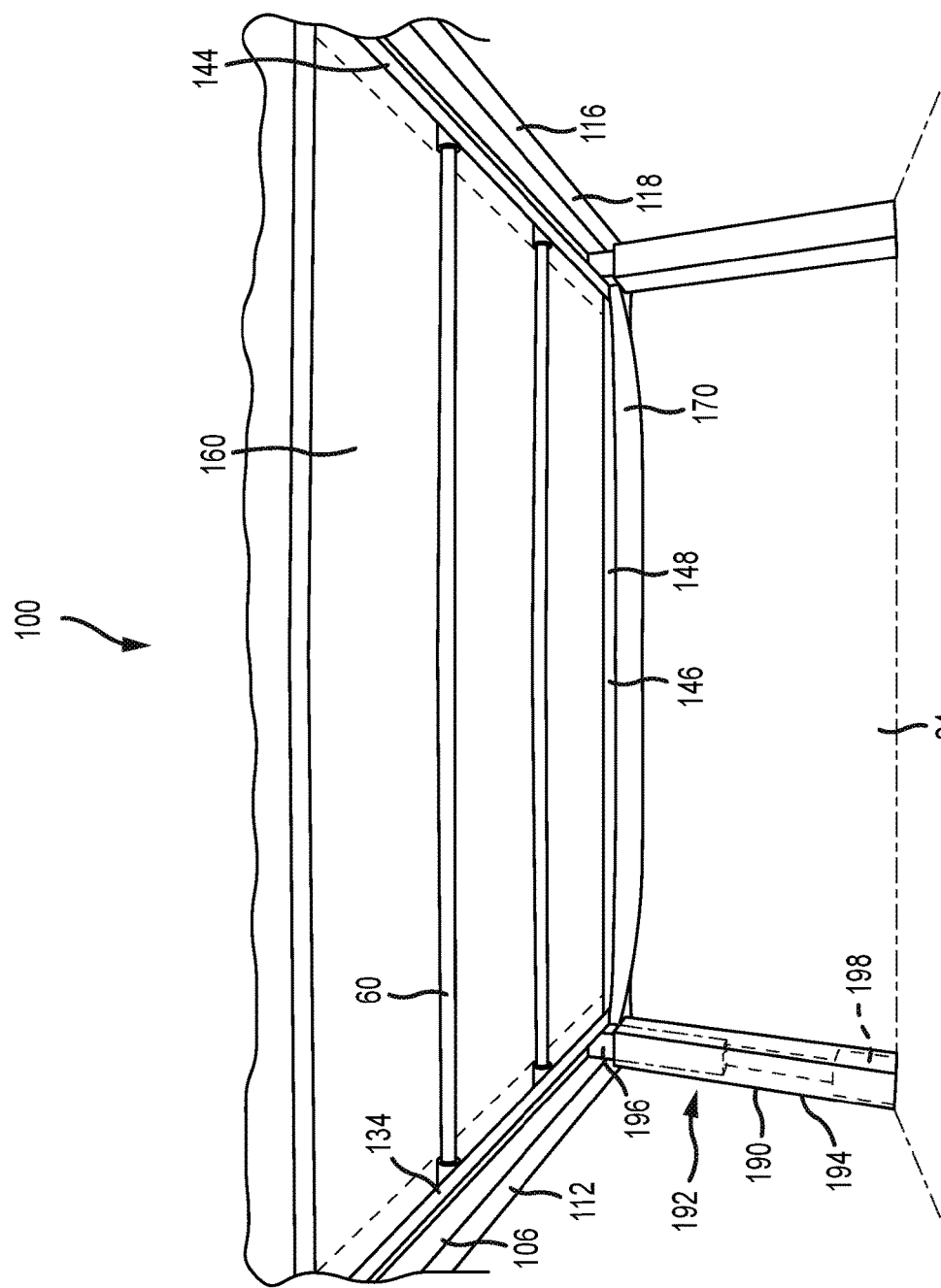
FIG. 4A is a partial bottom perspective view of the first embodiment system in the first position according to the present invention.
Figure 4B:
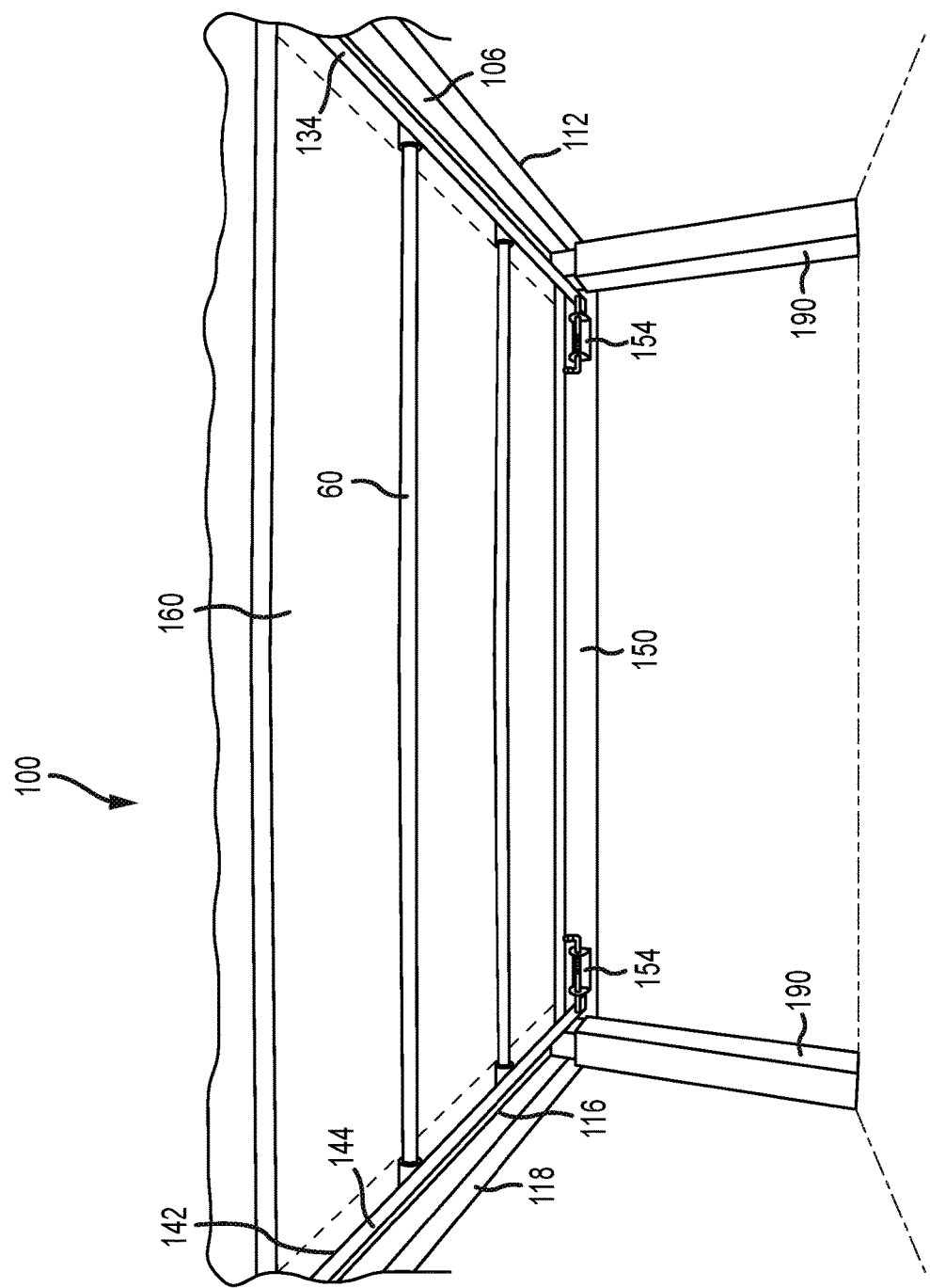
FIG. 4B is a partial rear perspective view of the first embodiment system in the first position according to the present invention.

Looking to FIG. 4B, the fourth cover member 150 is shown. The fourth cover member 150 preferably comprises a fourth cover member retainer 152 (see FIG. 2) and a pair of latches 154. The pair of latches 154 are configured to removably engage with the first and second cover members 126,136.

Figure 12:
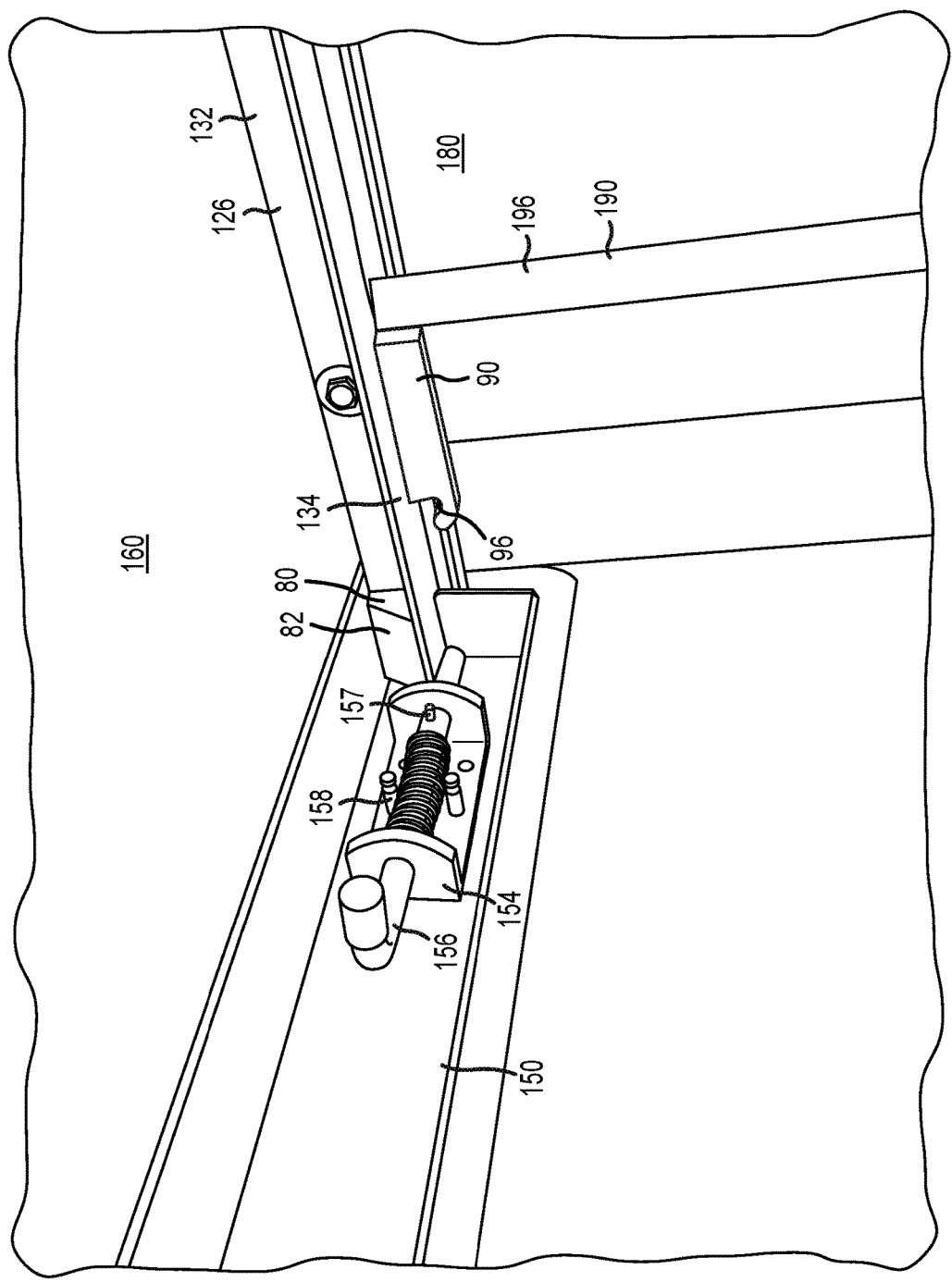
FIG. 12 is a close-up perspective view of a cover latch mechanism of the first embodiment system according to the present invention.

As shown in FIGS. 12 and 13, each of the latches 154 preferably has a spring-loaded rod 156 with a pin 157 configured to interface with the first and second cover member plates 132,142 of the respective first and second cover members 126,136 when in an engaged position. The interface with the first and second cover member plates 132,142 may be made through the respective first and second cam members 80,84. To disengage the fourth cover member 150 from the first and second cover members 126,136, the spring-loaded rods 156 are moved inward toward each other until clear of the first and second cover member plates 132,146 and potentially the first and second cam members 80,84, then the fourth cover member 150 is free to move relative to the first and second cover members 126,136. The spring-loaded rods 156 may be maintained in the disengaged position by placing the pin 157 against a catch 158.

To engage the fourth cover member 150 with the first and second cover members 126,136, the reverse of the disengaging procedure is performed; however, the spring-loaded rods 156 may be in the engaged position prior to engaging with the first and second cover members 126,136. In that case, during the process of lowering the fourth cover member 150 into position between the first and second cover members 126,136, each of the spring-loaded rods 156 will follow the surfaces 82,86 of the respective first and second cam members 80,84. Through the biased nature of the spring-loaded rods 156, the spring-loaded rods 156 will engage with the first and second cover member plates 132,142 when they are below the most inwardly extending portion of the first and second cam members 80,84.

Looking back to FIG. 5A, one method of securing the second compliant material 170 is shown with respect to the first rail member retainer 106 of the first rail member 104. The first end portion 172 of the second compliant material 170 is preferably fed into the first cover member retainer 106 through a slot 108 creating a loop 178 in the first end portion 172. Preferably, a dowel 50 is then inserted into the loop 178 along the length of the first rail member retainer 106. The diameter 52 of the dowel 50 is preferably greater than the width 110 of the slot 108, thereby retaining the first end portion 172 of the second compliant material 170 within the first rail member retainer 106. Clips (not shown) may further secure the free end 174 of the first end portion 172 of the second compliant member 170 to the first cover member retainer 106; however, as shown with respect to a second embodiment 200 of the cover system shown in FIG. 5B, the loop 178 may be formed by sewing (or otherwise attaching) the free end 174 back to the second compliant material. The same retention method is preferably provided for the second compliant material 170 within at least the second rail member 114, the third rail member 120, the first cover member 126, the second cover member 136, and the third cover member 146, and the first compliant material 160 within at least the fourth cover member 150.

The second frame 124 is preferably sized and configured to be positioned adjacent to and substantially over the first frame 102, whereby the first cover member 126, the second cover member 136, and the third cover member 146 of the second frame 124 are positioned substantially directly above the first rail member 104, the second rail member 114, and the third rail member 120 of the first frame 102, respectively, when the truck box cover system 100 is in the first position (see FIGS. 1, 2, and 5).

Additionally, as depicted in FIGS. 1-5, when in the first position, the second compliant material 170 along and between the first rail member 104 and the first cover member 126 is preferably substantially positioned within the first rail member enclosure 112 and the second compliant material 170 along and between the second rail member 114 and the second cover member 136 is preferably substantially positioned within the second rail member enclosure 118.

The second embodiment 200 of the cover system shown in FIG. 5B preferably comprises a first frame 202 with a first rail member 204 and a second frame 224 with first cover member 226. In the second embodiment 200, it should be understood that the second rail member (not shown) of the first frame 202 and the second cover member (not shown) of the second frame 224 are mirror images of the respective first rail member 204 and the first cover member 226. The first rail member 204 comprises a first rail member retainer 206 with a slot 208 and a first rail member enclosure 212. The first cover member 226 comprises a first cover retainer 228, a first cover member flange 230, and a first cover member plate 232 with a shelf 234. Preferably, a hook-and-loop fastener material 30 is provided on the inside surface of the first cover member flange 230.

The first compliant material 160 preferably comprises a first side 162, a second side 164, a third side 166, and a fourth side 168. The first and second sides 162,164 preferably comprise hook-and-loop fastener material (see FIG. 14) therealong and are configured to be removably attachable to the first and second cover member flanges 130,140 of the second frame 124, respectively. The third side 166 of the first compliant material 160 is preferably retained within the third cover member retainer 146 of the third cover member 146 and the fourth side 168 is preferably retained within the fourth cover member retainer 150 of the fourth cover member 150. The first compliant material 160 is shown as being removably attached by the hook-and-loop fastener material 30, however, additional or alternative fastening configurations, such as snaps, are contemplated.

Figure 11:
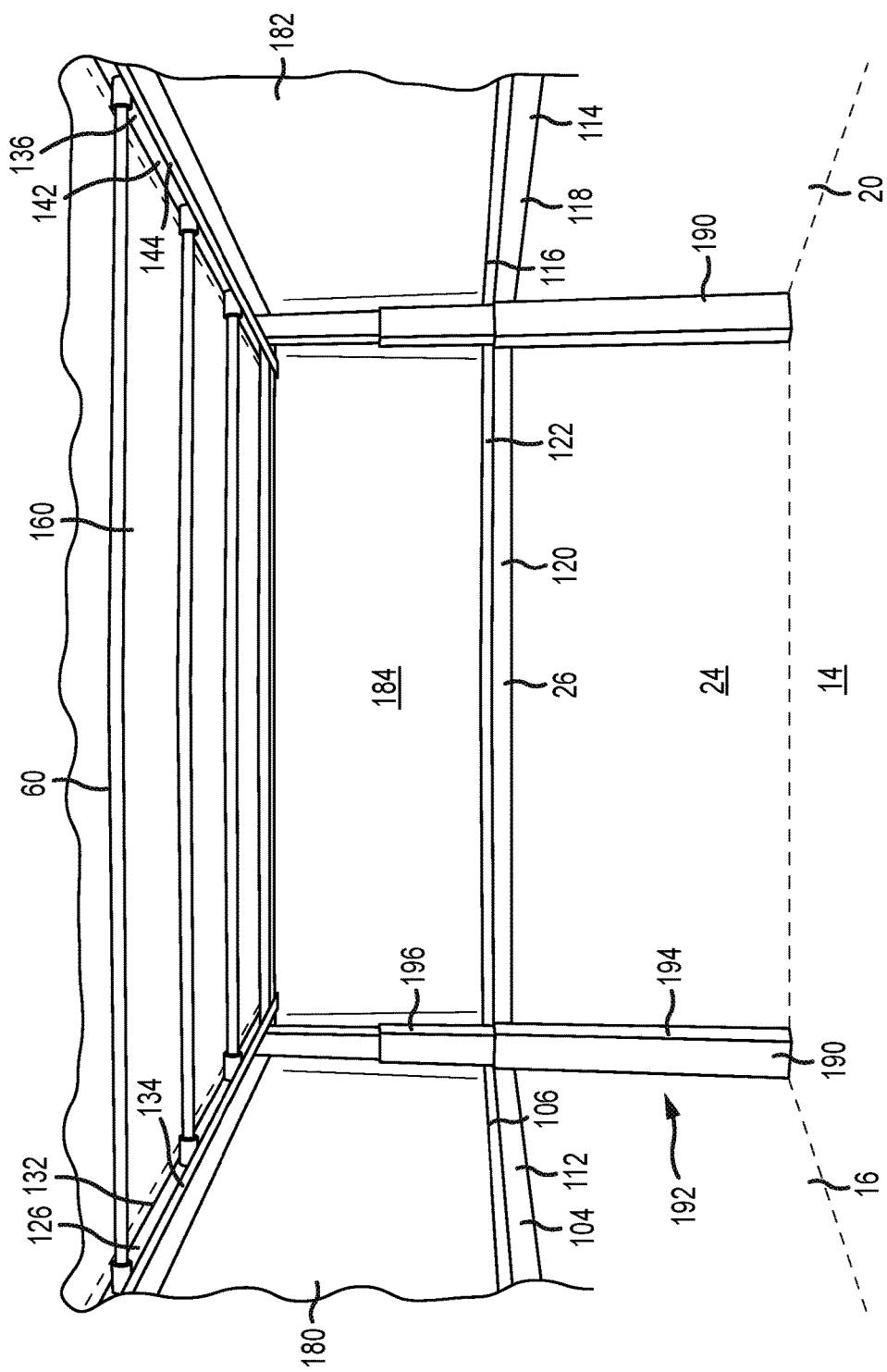
FIG. 11 is a partial rear perspective view of the first embodiment system in the second position according to the present invention.
Figure 14:
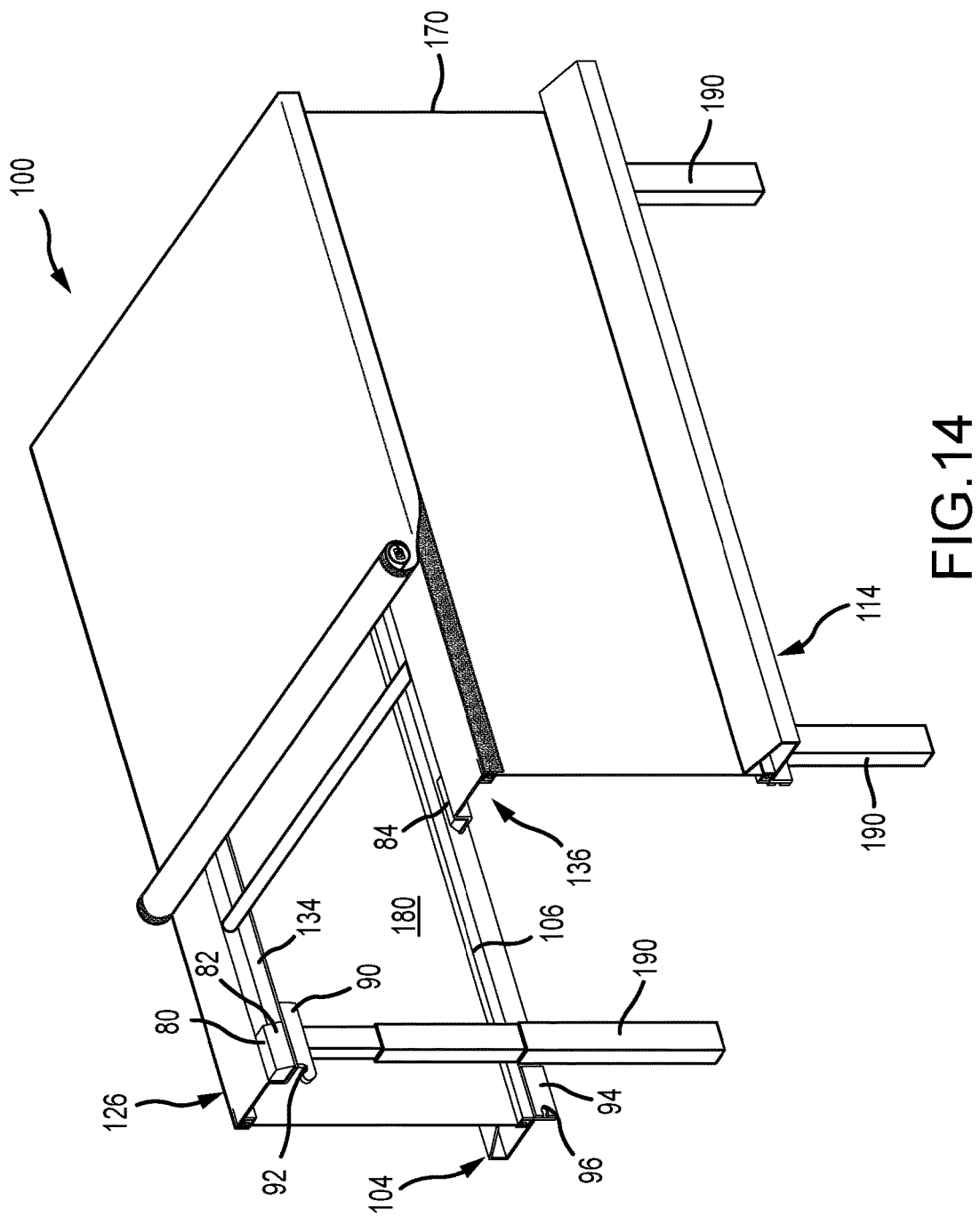
FIG. 14 is a rear perspective view of the first embodiment system in the second position according to the present invention.
Figure 15:
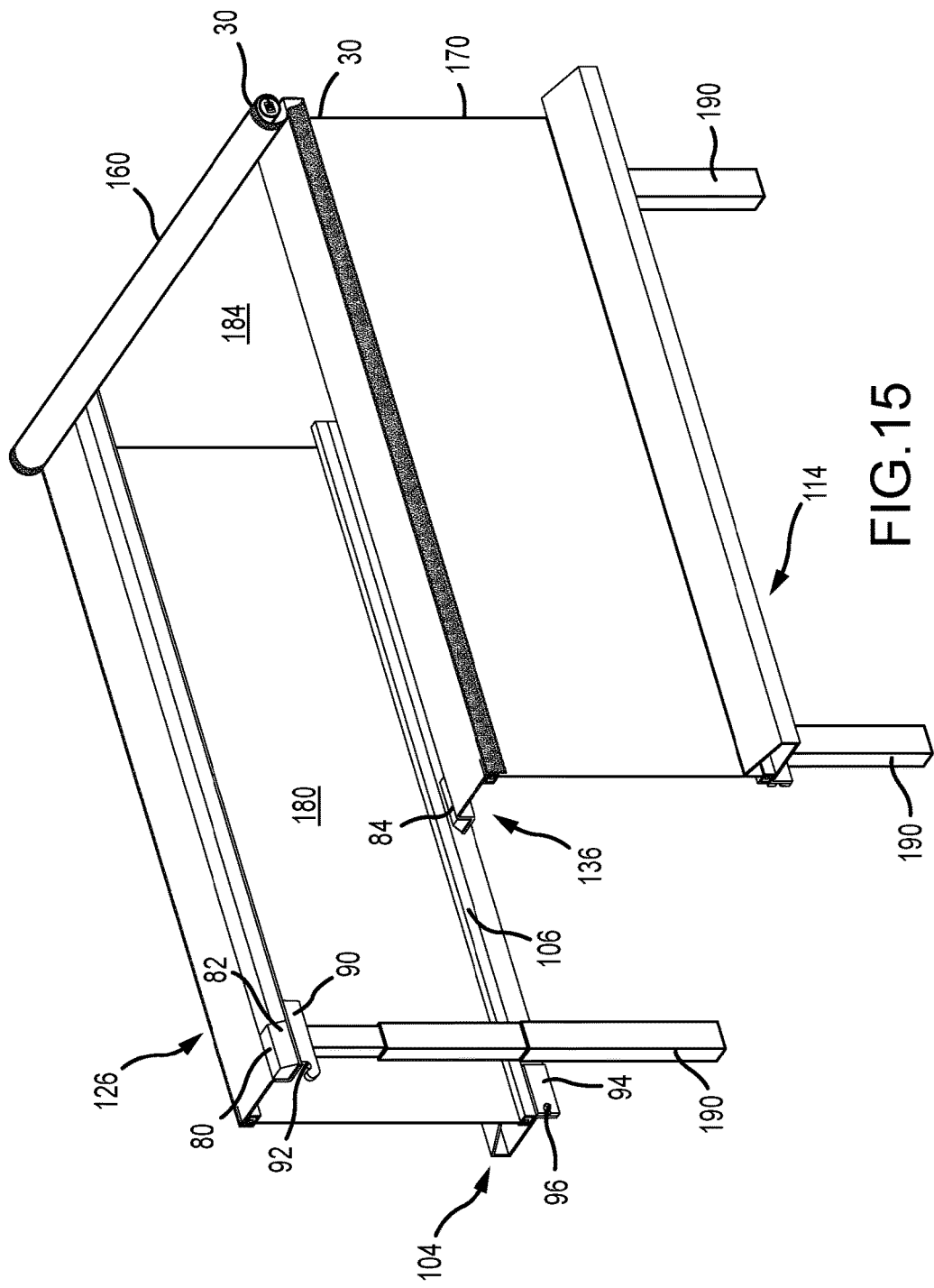
FIG. 15 is a rear perspective view of the first embodiment system in the second position according to the present invention.
Figure 16:
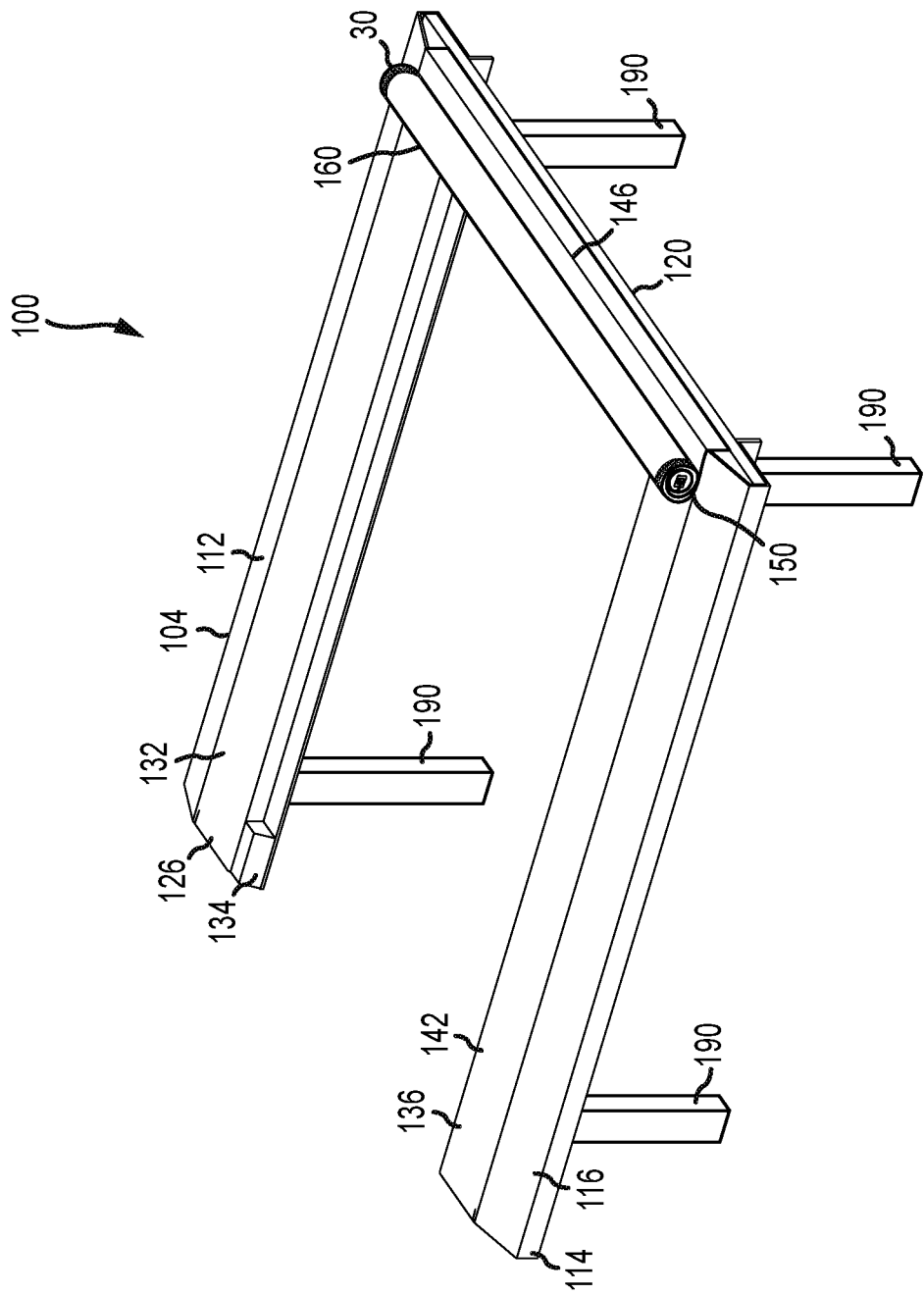
FIG. 16 is a front perspective view of the first embodiment system in the first position according to the present invention.

Looking at FIGS. 11 and 14, a plurality of removable cover supports 60 are shown. The plurality of cover supports 60 are preferably provided positioned on the shelves 134, 144 of the first and second cover members 126,136 and extend therebetween.

Each of the plurality of columns 190 preferably comprises a telescopic assembly 192 with a base 194, a telescopic portion 196 (see FIG. 11), and an actuator 198 (see FIG. 4A) preferably located within, or at least substantially within, the base 194 and configured to actively engage with the telescopic portion 196. The base 194 is preferably attached to at least one of the floor 14 of the truck box 12 and the first frame 102. The telescopic portions 196 are preferably attached to the second frame 124. Even more preferably, the telescopic portions 196 are attached to the first and second cover member plates 132,142 of as shown in FIG. 5A.

Figure 7B:
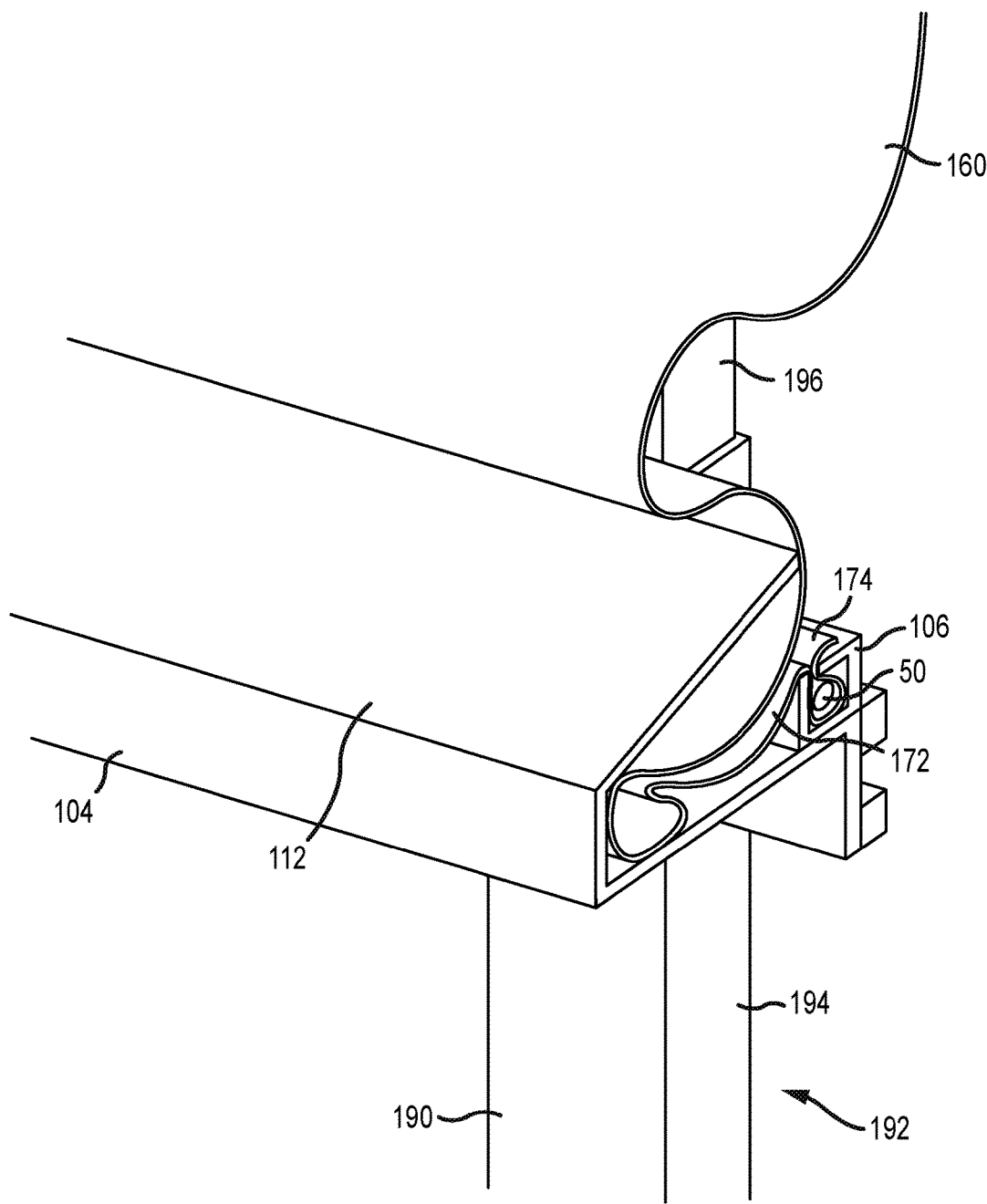
FIG. 7B is a partial rear perspective view of a rail member of the first embodiment system shown in FIG. 7A according to the present invention.
Figure 8:
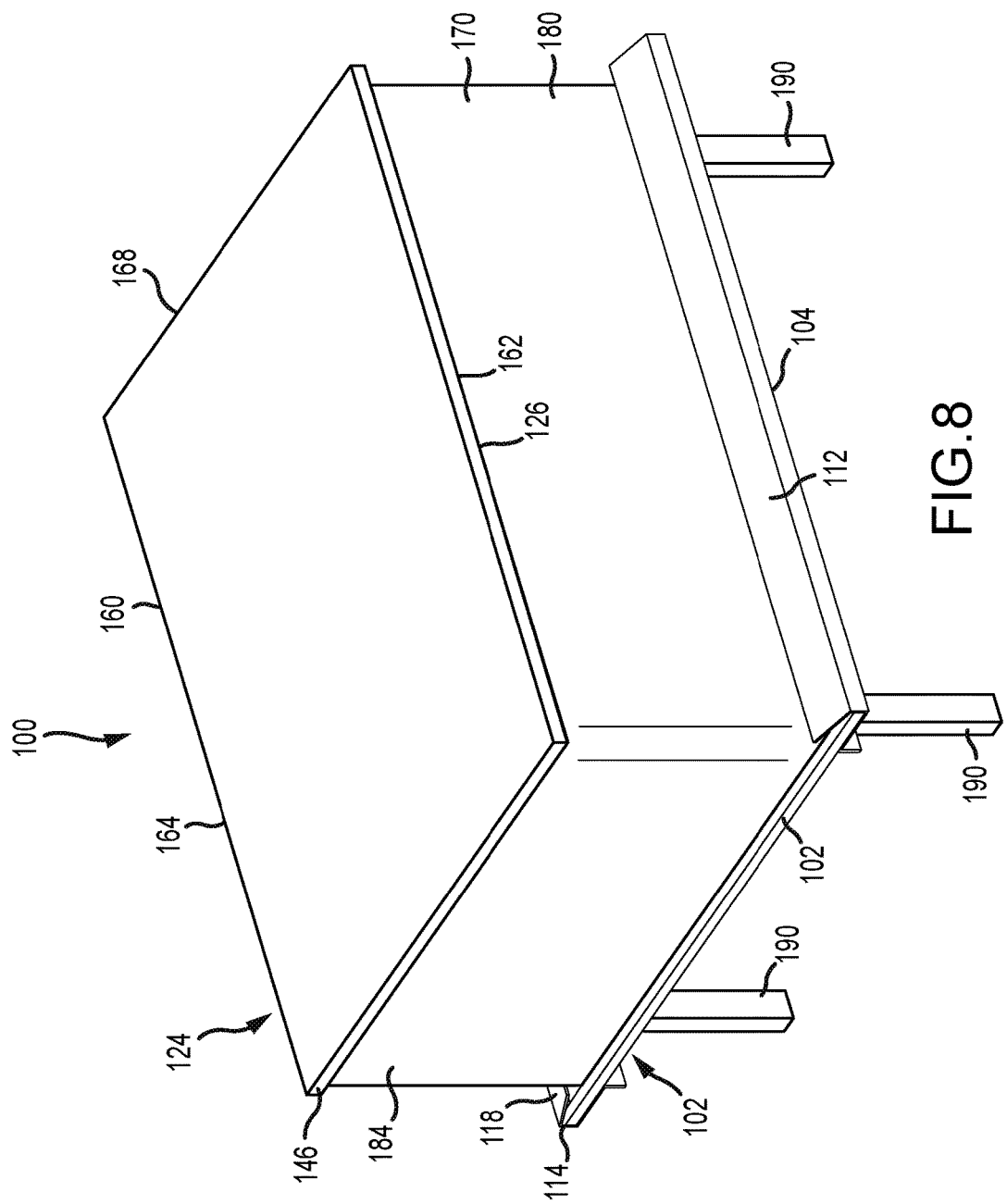
FIG. 8 is a front perspective view of the first embodiment system in the second position according to the present invention.
Figure 9:
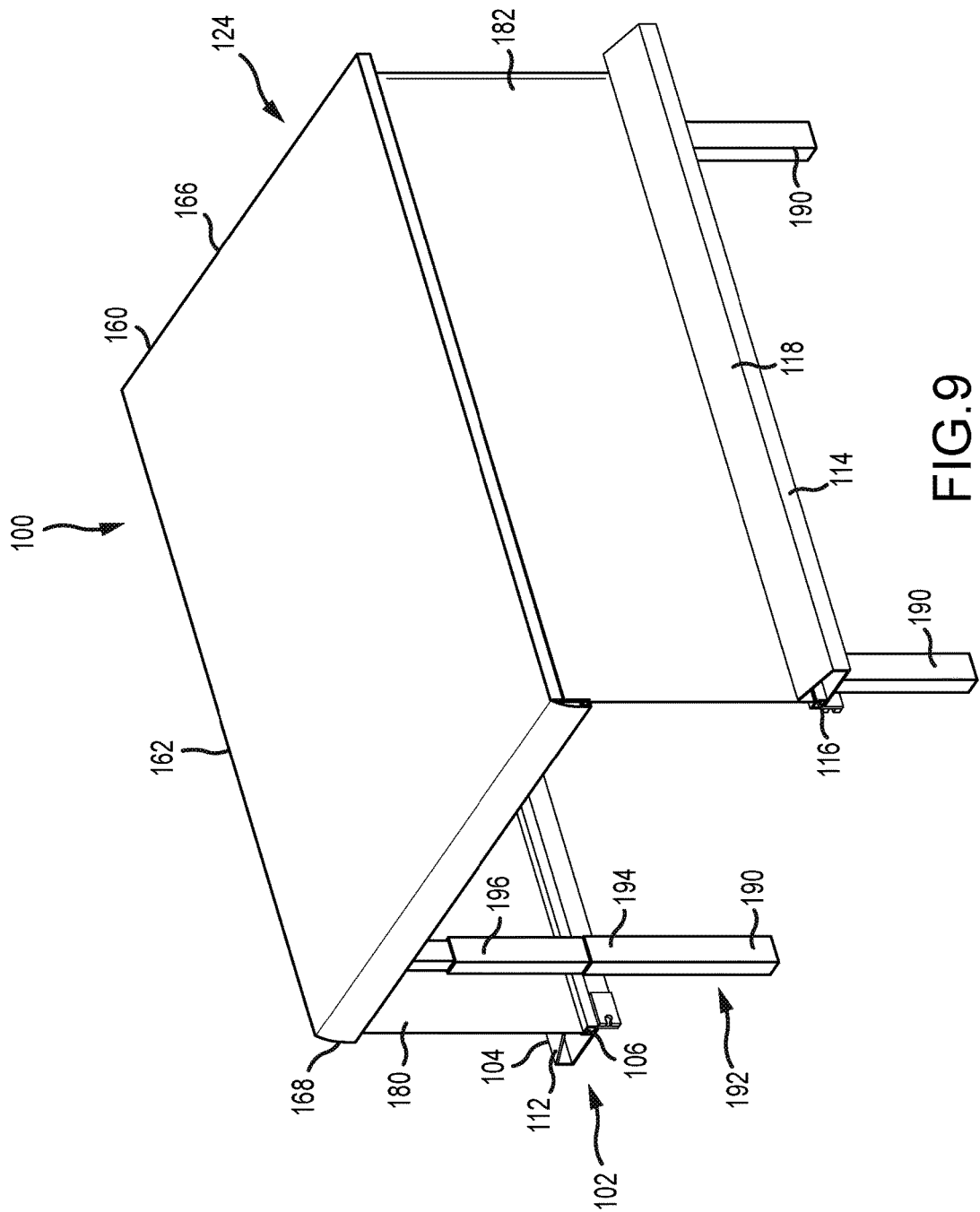
FIG. 9 is a rear perspective view of the first embodiment system in the second position according to the present invention.

Looking to FIGS. 6-7B, the cover system 100 is shown in an intermediate state as it is being raised from the first, lowered, position to a second, raised, position. Extension of the telescoping portions 196 is performed by activation of the actuators 198 through a switch (not shown) in electrical communication therewith. The switch (not shown) is preferably operated through a remote (not shown). Upon activation, the second frame 124 is raised relative to the first frame 102. As shown in FIGS. 7A and 7B, the second compliant material 170 is unfurled from the first and second rail member enclosures 112,118. The second compliant material 170 is preferably a continuous un-interrupted piece of material and made from a pliable and weather-resistant material such as a stretch tent textile.

The second frame 124 continues the upward assent until reaching the second position shown in FIGS. 8-11. In the second position, the second compliant member 170 is preferably made taught between the first frame 102 and the second frame 124 and provides a first wall 180, a second wall 182, and a third wall 184.

To return the second frame 124 to the first position, the actuators 198 are activated by the switch (not shown) in the reverse direction.

The actuators 198 are preferably hydraulically driven but a pneumatic system is also within the purview of the present invention. Activation of the actuators 198 to extend the telescoping portions 196 is preferably a one-touch activation, whereas the retraction of the telescoping portions 196 to lower the second frame 124 from the second position to the first position preferably requires constant activation of the switch (not shown) by a user (not shown). This is done to reduce the chance of user injury, damage to the cover 100, and/or the load (not shown) being carried in the truck box 12 by accidental activation; however, this functionality should not be viewed as limiting the invention. Additionally, or alternatively, a manually operated switch (not shown) may be included which must be manually closed prior to activation of the actuators 198.

Figure 17:
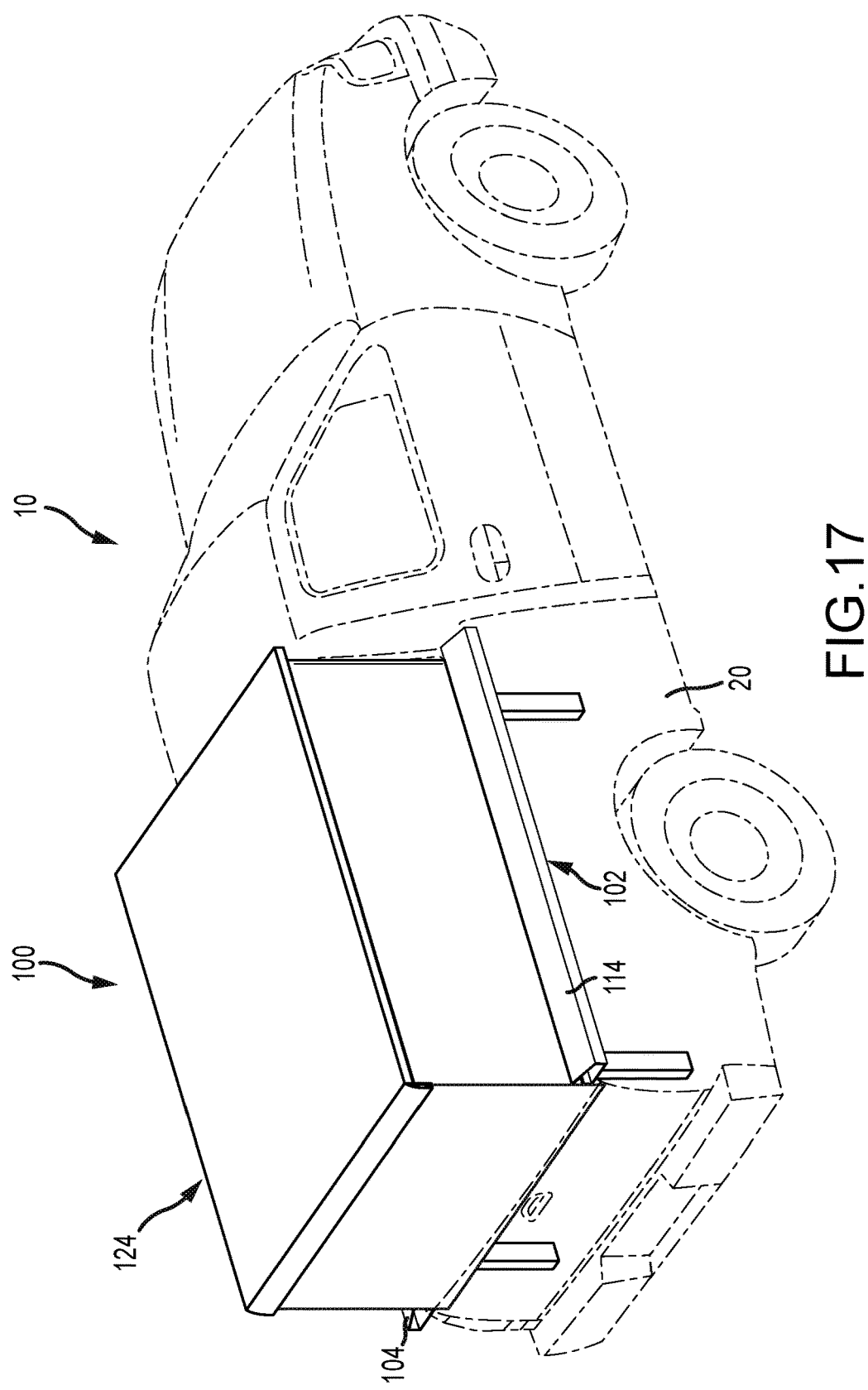
FIG. 17 is a perspective view of the first embodiment of the present invention.

Turning now to FIG. 17 in which the rear panel 70 is shown as installed. The rear panel 70 preferably comprises a first rod (hidden) provided along a first side 72 and a second rod (hidden) provided along a second side 74, a third side 76, and a fourth side 78. With reference to FIG. 13, the first rod (hidden) is receivable within the recesses 92 of a pair of upper brackets 90 attached to the first and second cover members 126,136 and the second rod (hidden) is receivable within the recesses 96 of a pair of lower brackets 94 attached to the first and second rail members 104,114. The third and fourth sides 76,78 are preferably configured to be secured in a weatherproof manner to the second compliant member 170. The weatherproof connection may be made through hook-and-loop material or any other method now known or later developed. The rear panel 70 is preferably formed from a compliant material, such as a stretch tent textile, and is configured to be rolled up and stored when not in use.

Turning now to FIGS. 18-21 a rack system 300 according to the present invention is shown. The rack system 300 is preferably configured to interface with the cover system 100,200. The rack system 300 comprises a plurality of upstanding members 302 and a plurality of cross-members 320.

Figure 21:
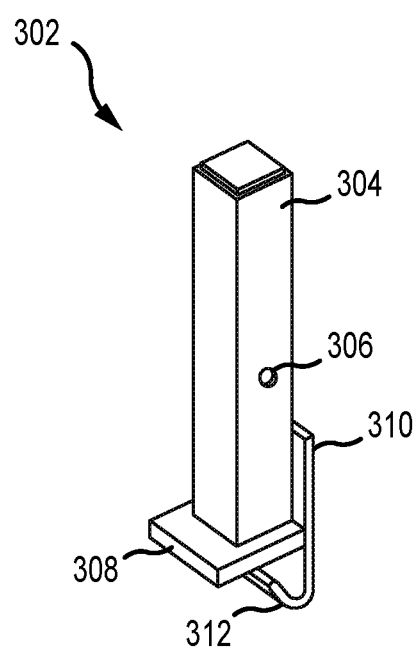
FIG. 21 is a perspective view of an upstanding member of the rack system according to the present invention.

FIG. 21 provides a view of an exemplary embodiment of an upstanding member 302 according to the present invention. The upstanding member 302 preferably comprises a pillar 304, with a through-hole 306, extending from a base 308, and an arm 310 extending alongside at least a portion of the pillar 304 and below the base 308. The arm 310 has an upturned end 312.

Figure 18:
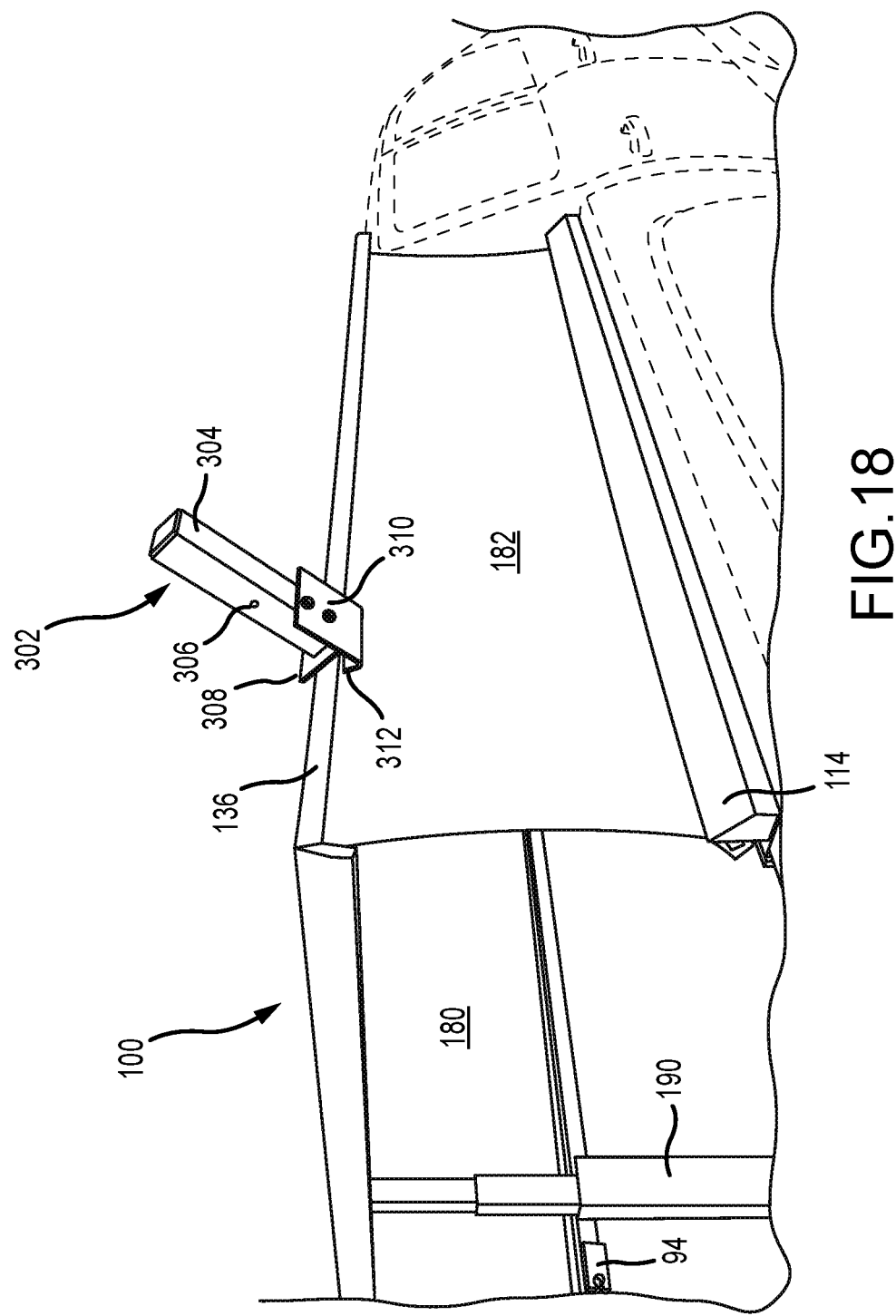
FIG. 18 is a perspective view of the first embodiment with a rack system according of the present invention.
Figure 19:
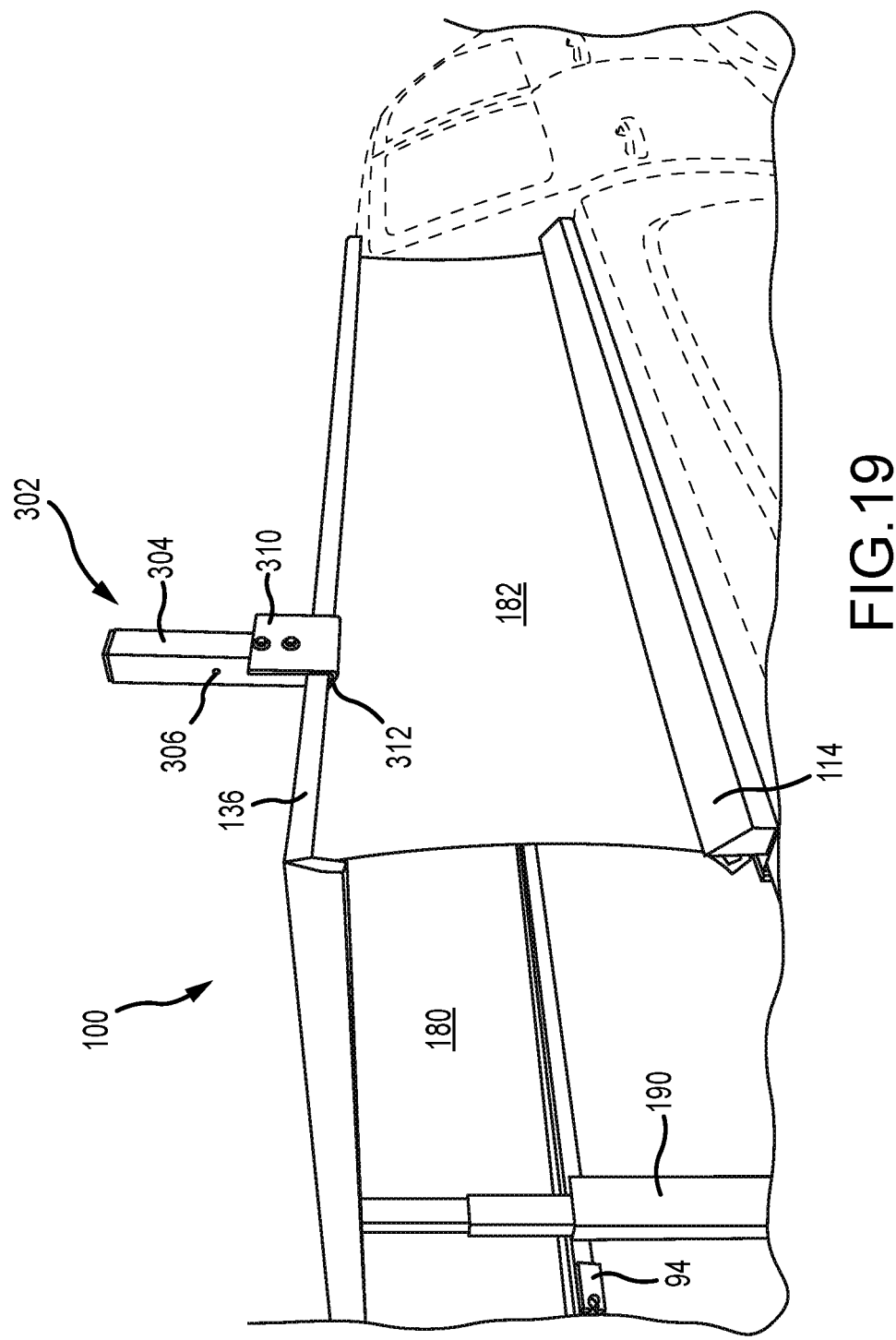
FIG. 19 is a perspective view of the first embodiment with the rack system according of the present invention.

Each upstanding member 302 is configured to interface with the first and second cover members 126,136. As shown in FIGS. 18 and 19 with respect to placement of an upstanding member 302 on the second cover member 136, the upstanding member 302 is positioned with the upturned end 312 received within the second cover member retainer 138 between the second cover member retainer 138 and the second cover member flange 140 with the remainder of the arm 310 that is below the base 308 abutting the outside of the second cover member flange 140. The base 308 is positioned atop the second cover member 136. This arrangement allows for increased versatility as the plurality of upstanding members 302 may be placed at any location along the first and second cover members 126,136.

Figure 20:
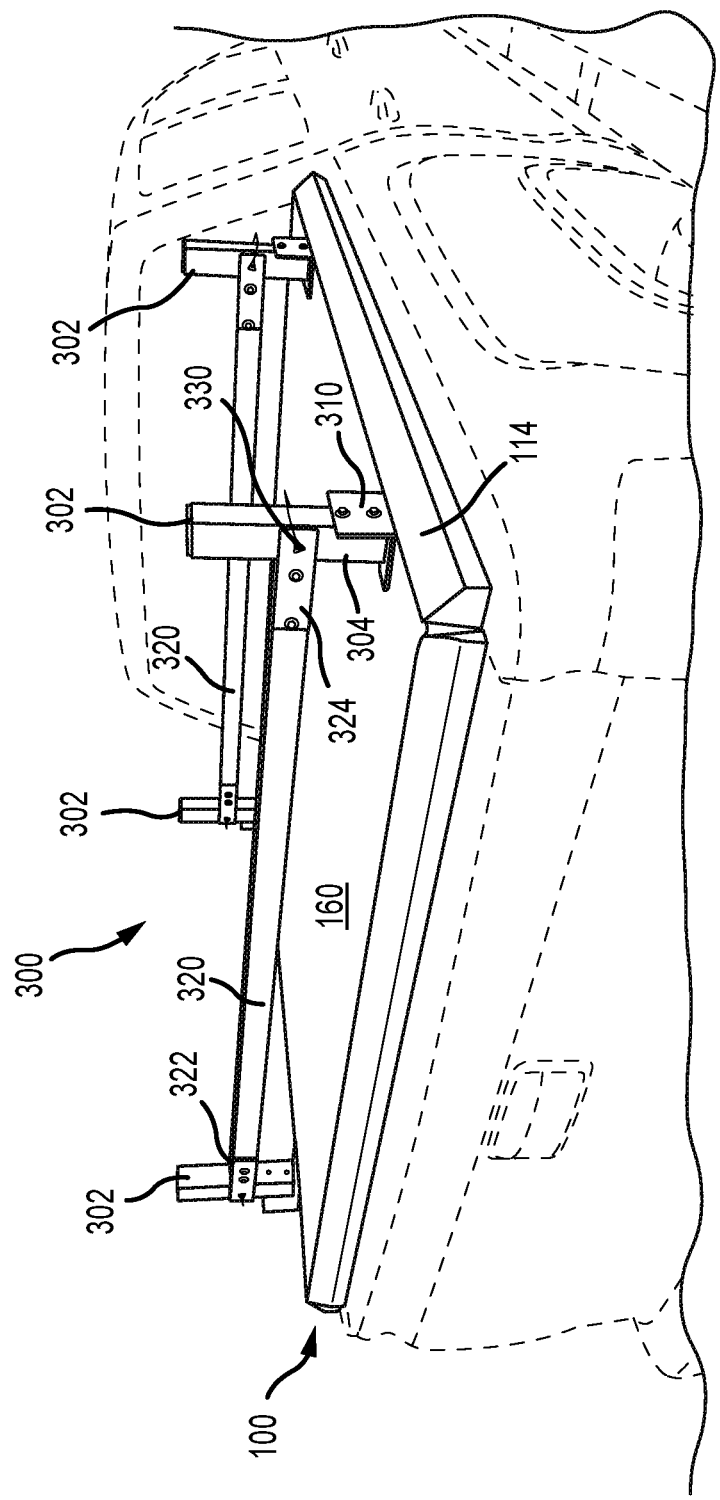
FIG. 20 perspective view of the first embodiment with the rack system according of the present invention.

FIG. 20 illustrates the plurality of cross-members 320 attached to and extending between opposing upstanding members 302. Here, the plurality of cross-members 320 have through-holes (hidden) at opposing end portions 322, 324 which are configured to be alignable with the through-holes 306 of the pillars 304. The plurality of cross-members 320 are preferably removably attached to the upstanding members 302 with pins 330 extending through the aligned upstanding member through-hole 306 and the cross-member through-hole (hidden), however, other methods of removable attachment are contemplated, such as by a threaded fastener (not shown). It should also be noted that the placement of the plurality of cross-members 320 on the plurality of upstanding members 302 may be adjustable.

The rack system 300 is configured to be incorporated and usable with both cover system 100,200 in both the first position and the second position. FIGS. 18-20 illustrate thus with the cover system 100.

A method for raising and lowering a truck box cover is also contemplated according to the present invention and is describes with respect to the first embodiment of the truck box cover assembly 100. The method preferably comprises the steps of: providing a first frame 102 and a second frame 124; providing a plurality of telescopic assemblies 192 operably connected to the first frame 102 and the second frame 124, whereby the second frame 124 is configured to be movable relative to the first frame 102 through activation of the plurality of telescopic assemblies 192 between two positions: a first position and a second position; whereby in the first position the first frame 102 and the second frame 124 are juxtaposed and in the second position the first frame 102 and the second frame 124 are spaced apart; providing a first compliant member 160 supported by and extending across the second frame 124; providing a second compliant material 170 supported by and extending between the first frame 102 and the second frame 124; whereby, when in the first position, activating the plurality of telescoping assemblies 192 to move the second frame 124 to the second position wherein the second compliant material 170 is taut; and whereby when in the second position, activating the plurality of telescoping assemblies 192 to move the second frame 124 to the first position. The method further comprises the step of actively monitoring the truck box cover system 100 when moving from the second position to the first position. Active monitoring may include, but should not be limited to, constantly maintained activation of the plurality of telescopic assemblies 192 by a user (not shown) and/or pressure sensors (not shown) monitoring force applied in a direction different than the downward movement of the second frame 124. The method may further comprise the step of tucking the second compliant member 170 into a first rail member retainer 112 and a second rail member enclosure 118 of the first frame 102 when moving the second frame 124 from the second position to the first position.

Figure 22:
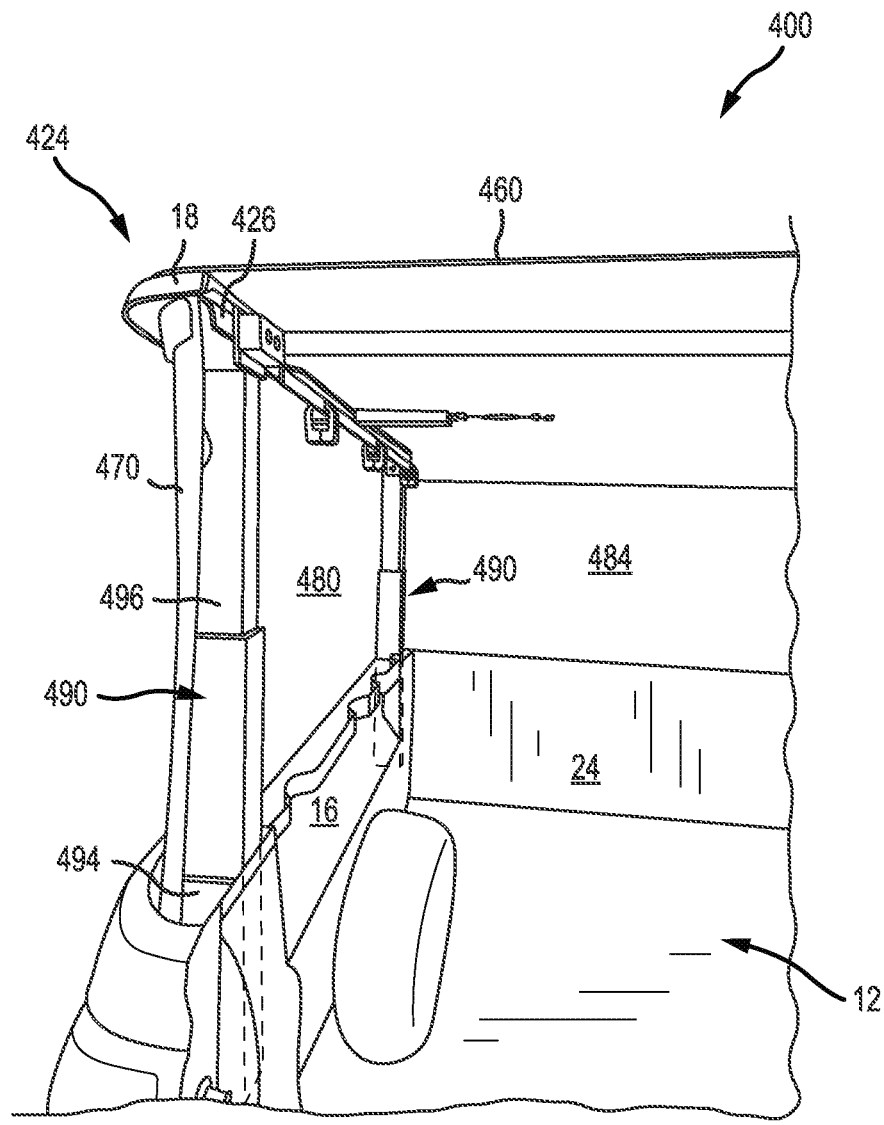
FIG. 22 is a perspective view of a third embodiment of a truck box cover system in the second position according to the present invention.

FIG. 22 illustrates a third embodiment 400 of a truck box cover according to the present invention. The cover 400 preferably comprises a frame 424, a top 460, a compliant member 470, and a plurality of columns 490.

Similar to the first and second embodiments 100, 200, the frame 424 preferably comprises a first cover member 426, a second cover member (not shown), and a third cover member (hidden), which preferably follow along the top of the first body panel 16, the second body panel 20 (see FIG. 11), and the box end panel 24, respectively. Preferably, the first cover member 426 and the second cover member (not shown) are attached to or incorporated into the first box rail 18 and the second box rail 22 (see FIG. 10), respectively.

The compliant material 470 is preferably supported by and extends between the frame 424 and the first body panel 16, the second body panel 20 (see FIG. 11), and the box end panel 24.

Each of the plurality of columns 490 preferably comprise a telescopic assembly 492 with a base 494, a telescopic portion 496, and an actuator (hidden, but see the actuator 198 in FIG. 4A). Preferably, there are four columns 490, one near each corner of the box 12 with the base 494 of two preferably positioned within and attached to or incorporated into the first body panel 16 and two preferably positioned within and attached to or incorporated into the second body panel 20 (see FIG. 10).

It is contemplated that the top 460 may be removable from the frame 424. The top 460 may be comprised of a soft material and/or a hard material configured to attach to the frame 424 and cover the truck box 12.

Preferably, the operation of the cover 400 is as described above with respect to the first and second embodiments 100,200; however, the frame 424 will be moving from a first position to a second position relative to the truck box 12 as the plurality of columns 490 are attached to or incorporated into the truck box 12. When in the second position, the compliant material 470 forms a first wall 480, a second wall (not shown), and a third wall 484.

Figure 23:
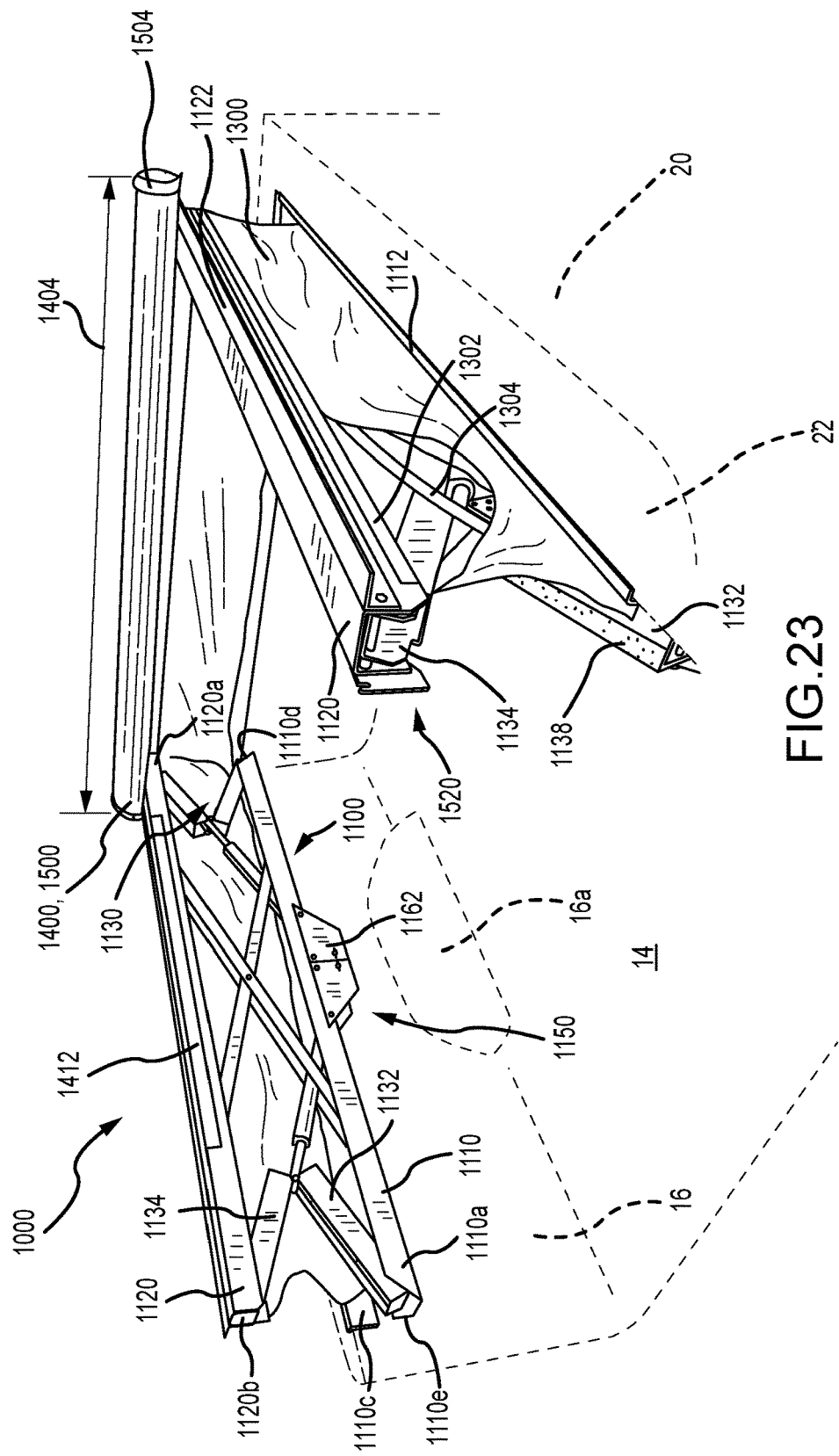
FIG. 23 is a right rear perspective view of a fourth embodiment of a truck box cover system according to the present invention.
Figure 24:
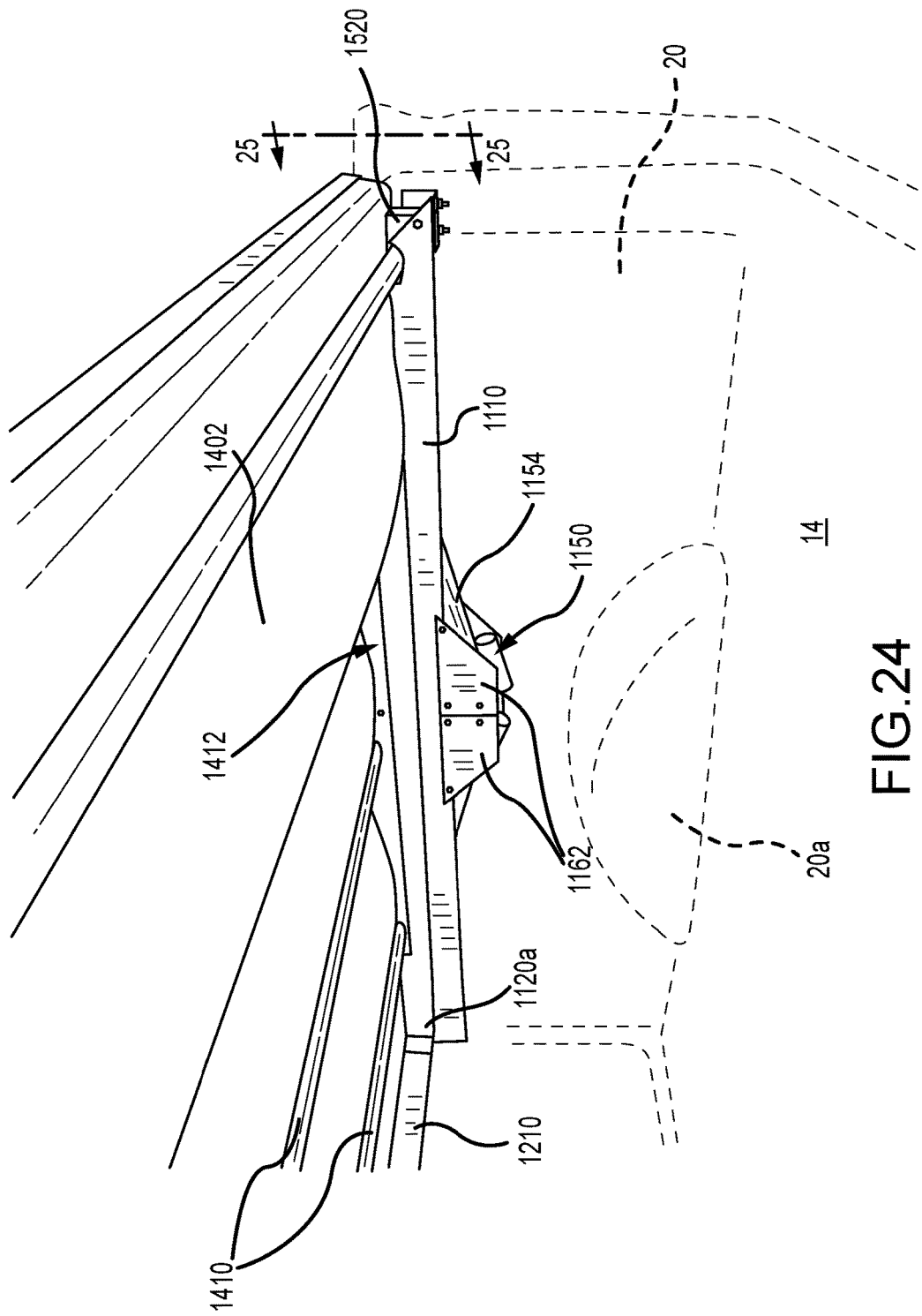
FIG. 24 is a bottom left perspective view of the embodiment of FIG. 23 in a first position.
Figure 25:
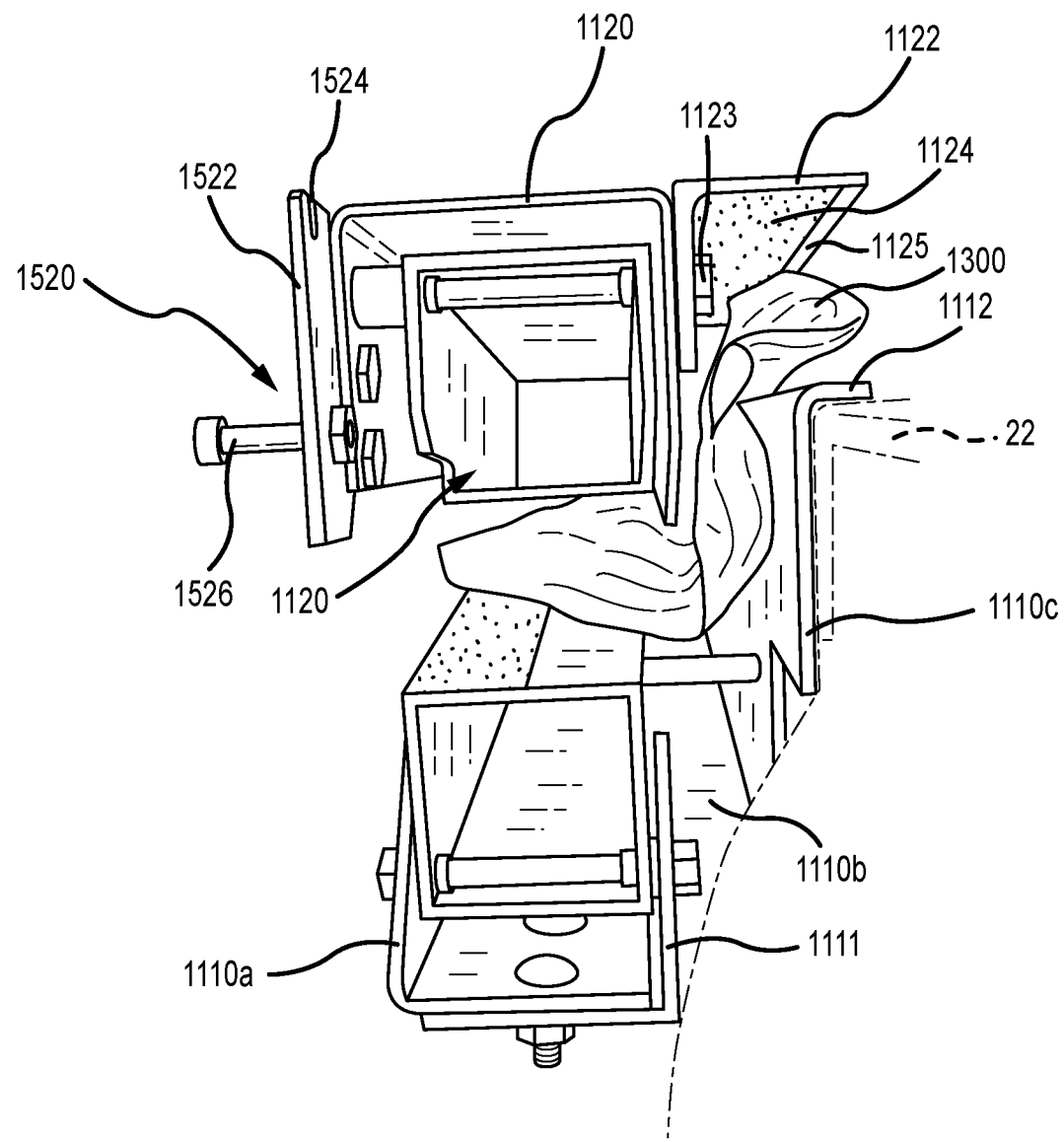
FIG. 25 is a rear end elevation view taken along lines 25-25 of FIG. 24.
Figure 31:
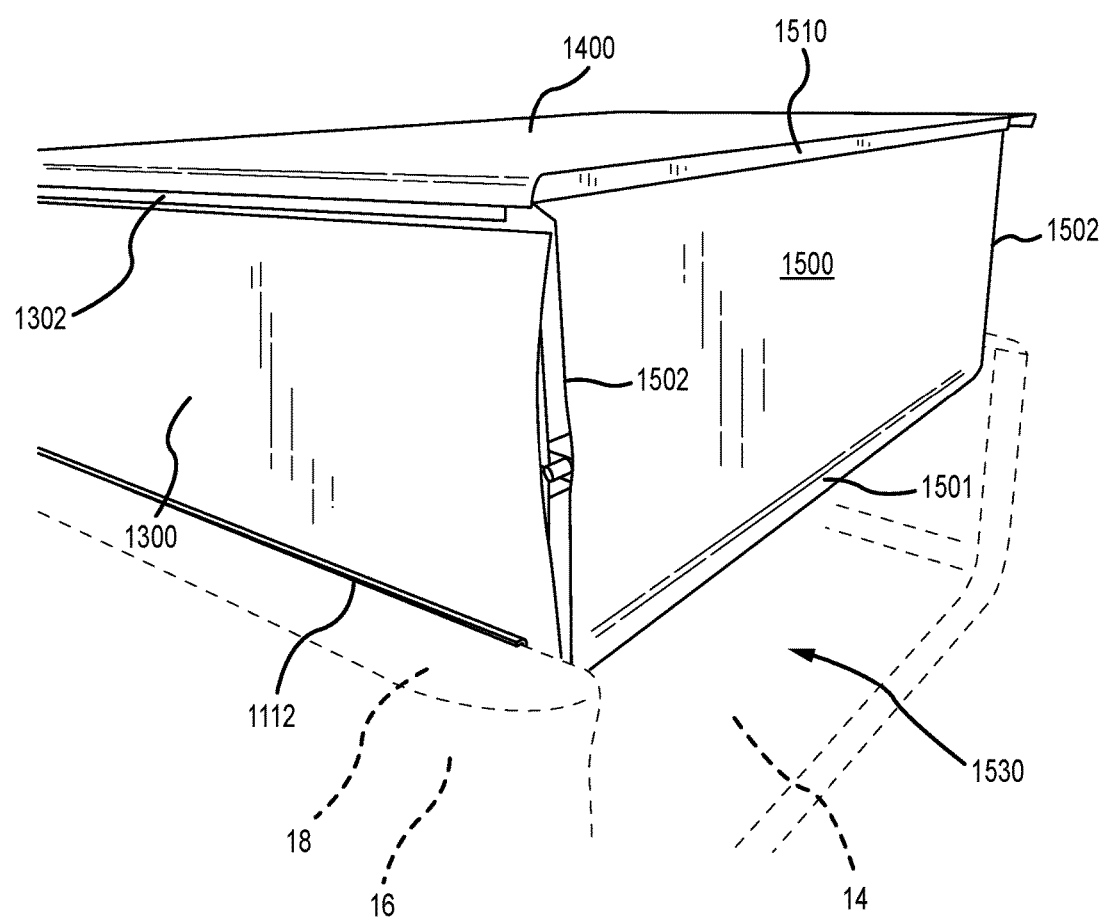
FIG. 31 is a fourth left rear perspective view of the embodiment of FIG. 23 in a fourth position.
Figure 32:
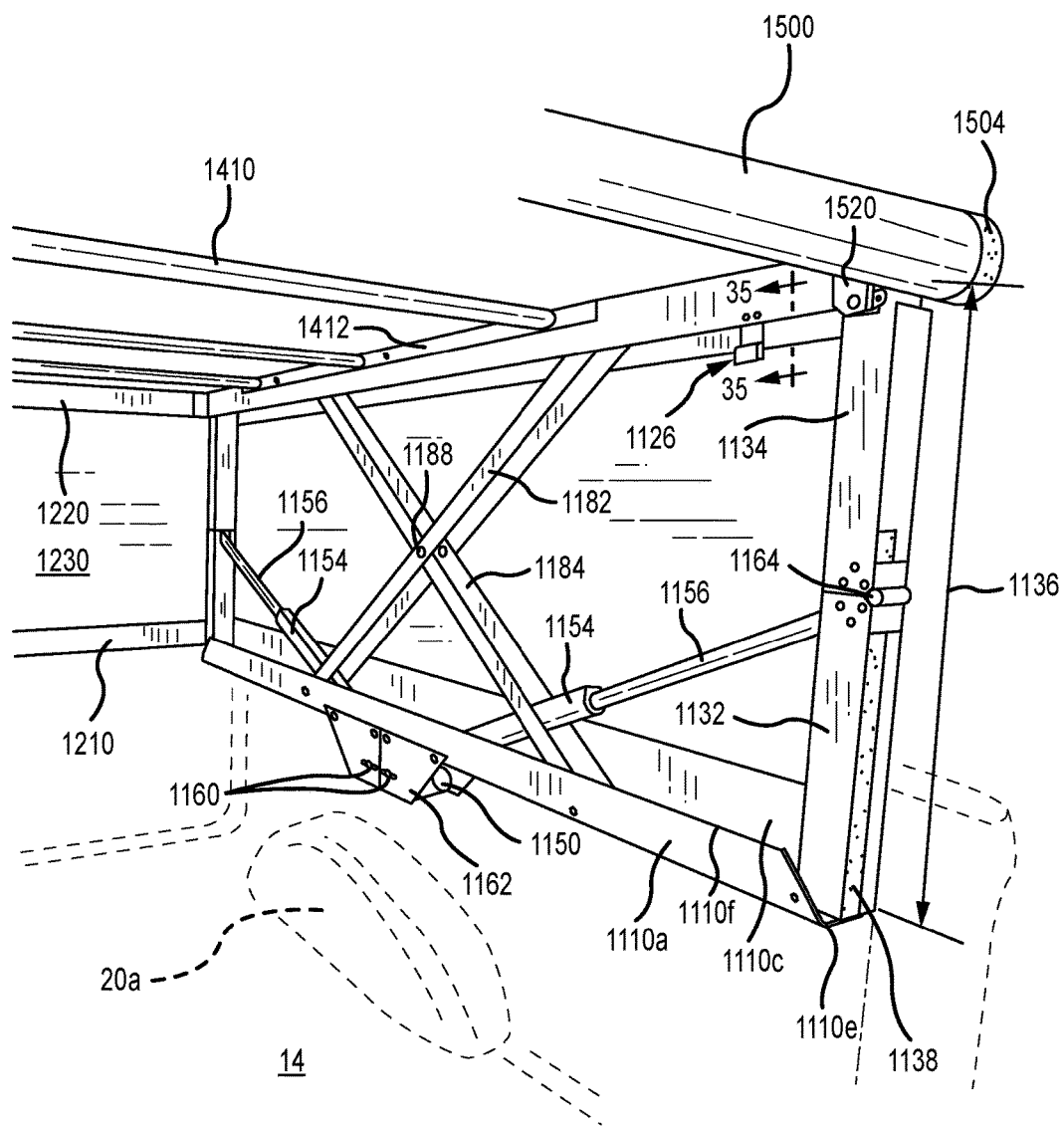
FIG. 32 is a fifth left rear perspective view of the embodiment of FIG. 31 in the fourth position.
Figure 33:
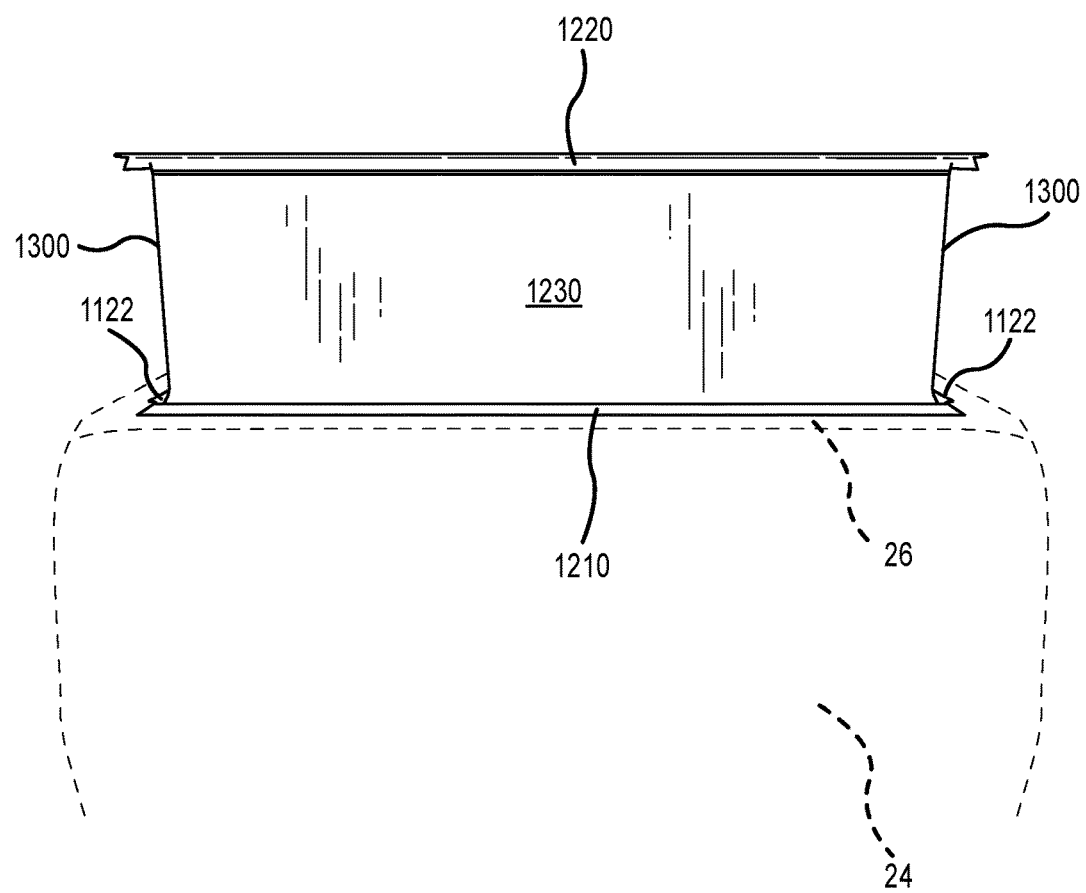
FIG. 33 is a front elevation view of the embodiment of FIG. 31 in the fourth position.

Turning now to FIGS. 23-33, a fourth embodiment 1000 of a truck bed cover system according to the present invention. Generally, this embodiment 1000 preferably includes two side frame assemblies 1100, a front frame assembly 1200, at least one side panel 1300, a top 1400, and a rear panel 1500. The two side frame assemblies 1100 are preferably at least substantially the same, albeit adapted to be secured to a truck bed box 12 on opposite left and right sides of the truck bed box 12. The frame assemblies 1100 are configured to move at least substantially contemporaneously between a first (e.g., lower or collapsed) position, as shown in FIG. 24, and a second (e.g., raised or extended) position, as shown in FIGS. 31-33.

Each frame assembly 1100 includes a first longitudinal channel 1110 (e.g., bottom channel) and a second longitudinal channel 1120 (e.g., top channel), the channels 1110, 1120 being disposed preferably at least substantially parallel to each other. The first channel 1110 is preferably generally U-shaped (the U-shape including an inner leg 1110a, a base 1110b, and an outer leg 1110c) and extends from a front end 1110d to a rear end 1110e. The outer leg 1110c is preferably longer (i.e., extends further from the base 1110b) than the inner leg 1110a. The second channel 1120 is preferably a U-shaped channel extending longitudinally from a front end 1120a to a rear end 1120b. The open sides of the U-shaped channels preferably face each other to accommodate other structure at least partially within a chamber formed by the channels when they are in a first position. That said, the bottom or lower channel 1110 may be wider than the top or upper channel 1120 (its base 1110b may be wider than the similar structure on the second channel 1120). This width may provide adequate spacing between the outer leg 1110c and the segmented end rails 1130, described below, so as to allow the panels 1300,1230 to be received therein for storage when the assemblies 1100 are in the first, or lowered, position. With such spacing, and to keep the end rails 1130 aligned, an L-shaped leg bracket 1111 may be secured to or formed integrally with the lower channel 1110 at each end thereof to receive and rotatably support the lower leg 1132 of the end rails 1130. Along the first channel 1110, a mounting rail 1112 is provided along preferably a majority of the longitudinal length of the channel 1110, or at a plurality of discrete locations along such length. The mounting rail 1112 is sized and configured to overlap a portion of a box rail 18,22 of a side panel 16,20 of a truck bed box 12, so as to position the first channel 1110 substantially parallel to the truck bed floor 14, and/or above a wheel well 16a,20a. The mounting rail 1112 may be extruded (or otherwise bent) as an integral part of the first channel 1110 or otherwise secured to the channel 1110. Along the second channel 1120, a registration rail 1122 is provided along preferably a majority of the longitudinal length of the channel 1120, or at a plurality of discrete locations along such length. The registration rail 1122 is sized and configured to overlap a portion of the mounting rail 1112. The registration rail 1122 may be extruded (or otherwise bent) as an integral part of the second channel 1120 or otherwise secured to the channel 1120, such as with threaded mated fasteners 1123. The registration rail 1122 provides a resistive element to yield retraction to a first position, and also provides for weather resistance. For instance, on a side or, preferably, bottom surface 1125 of the registration rail 1122, one side of a hook-and-loop fastener (i.e., hook or loop, or combination) 1124 may be provided along a length of one or both legs 1132,1134 situated at or near the second end 1110e,1120b to assist in maintaining the top panel 1400 in position, as later described.

Segmented end rails 1130 are provided near or at each end of the channels 1110,1120, which each pair of respective ends may be substantially vertically aligned. Each end rail 1130 has a bottom leg 1132 and a top leg 1134. The bottom leg 1132 is rotatably connected to the bottom channel 1110 and the top leg 1134. The top leg 1134 is rotatably connected to the bottom leg 1132 and the top channel 1120. Each leg is preferably formed from an extruded (or otherwise formed) tubular stock (e.g., having a rectangular, square, or even U-shaped cross-section) having been cut to a desired length, which is preferably about one-half of the total length 1136 of the end rail 1130 when extended in the second position shown in FIG. 32. One side of a hook-and-loop fastener (i.e., hook or loop, or combination) 1138 may be provided along a length of one or both legs 1132,1134 situated at or near the second end 1110e,1120b to assist in maintaining the rear panel 1500 in position, as later described. The bottom leg 1132 and/or the top leg 1134 may include a rod clearance notch 1139 formed therein to allow clearance for the actuation rod 1156 during motion of the frame assembly 1100, as later described.

Each frame assembly 1100 also preferably includes an actuation mechanism 1150. A preferred actuation mechanism 1150 includes a pair of linear actuators 1152, each including an actuation cylinder 1154 and an actuation rod 1156 slidably received within the cylinder 1154. The actuation cylinder 1154 includes an anchor end 1158, which is rotatably mounted with respect to the lower channel 1110, such as by being mounted on bearing rods 1160 journaled or otherwise allowing rotation with respect to a bearing plates 1162 secured to the lower channel 1110. The bearing plates 1162 serve both to support the anchor end 1158 of the actuators 1152 and also to serve as a layer of pinch-point protection as between the actuators 1152 and the lower channel 1110. Alternatively, the anchor ends 1158 may be mounted within the lower channel 1110 to minimize form factor and number of pinch points. The actuation rod 1156 includes an extension end 1164 rotatably coupled to the lower leg 1132, the upper leg 1134, or, most preferably, the hinged connection between the lower leg 1132 and the upper leg 1134.

Each frame assembly 1100 may also include additional support structure, such as a cross brace 1180 including a first brace 1182 and a second brace 1184. Each brace 1182,1184 may be formed from an extruded U-channel material, such as aluminum, with one channel being sufficiently narrower than the other, so as to be received through a slot formed in the other. Alternatively, one or both braces 1182,1184 may be formed from rod or bar material, such as flat stock. If formed from flat stock, it has been found that a single flat-stock brace member (as opposed to a compound brace formed from multiple parallel flat-stock brace members) provides sufficient stability. One end (either top or bottom) of each brace 1182,1184 is rotatably mounted to one of the channels 1110,1120 and the other end is allowed to slide in the other channel. Preferably, the top end of each brace 1182,1184 is rotatably mounted to the top channel 1120, such as at a bearing connection 1186. The braces 1182,1184 are also preferably rotatably mounted to each other, such as at a point 1188 that is approximately midway along their respective lengths. At the bottom end, there is preferably provided a roller that allows the braces 1182,1184 to roll along the base 1110b or within a longitudinal slot provided therein.

The front frame assembly 1200 generally includes a front mounting rail 1210 and a front registration rail 1220. The front mounting rail 1210 is configured and adapted to be secured to the box end panel 24 or third box rail 26, and the front registration rail 1220 is configured and adapted to be secured to and move with the first end 1120a of the upper channel 1120.

The at least one side panel 1300 extends between and is secured to a lower channel 1110 or otherwise secured in at least a substantially stationary relationship to the truck bed side panel 16,20 and/or box rail 18,22, and to an upper channel 1120 or otherwise secured in at least a substantially stationary relationship to the upper channel 1120. The side panel 1300 is preferably formed from a pliable fabric, such as a polyurethane-coated (e.g., water resistant or waterproof), stretchable (preferably 4-way stretch), tricot polyester (e.g., 85% polyester, 15% spandex), and can be secured to respective locations in a variety of ways. One way to secure the fabric 1300 to a structure is to use a longitudinal connector including a female slot portion 1302 and a male tab portion 1304, whereby when the fabric 1300 is engaged with the male tab portion 1304 and inserted into the female slot portion 1302, the fabric 1300 is held thereby. Preferably each of the frame assemblies 1100 is provided with a side panel 1300, as described. A front panel 1230 is similarly or identically secured to the front frame assembly 1200. The front panel 1230 is preferably formed from a pliable fabric, such as a polyurethane-coated (e.g., water resistant or waterproof), stretchable (preferably 4-way stretch), tricot polyester (e.g., 85% polyester, 15% spandex), and can be secured to respective locations in a variety of ways. The front panel 1230 preferably spans any gap between side panels 1300, and may be formed from the same sheet of material as the side panels, thus providing a seamless three-walled enclosure. Alternatively, the front panel 1230 could be sewn (or otherwise fastened) to the side panels 1300, generally to provide a continuous three-sided enclosure.

The top 1400 preferably includes a fabric top sheet material 1402, which extends a sufficient width 1404 to span a distance between the pair of frame assemblies 1100, plus some overhang supplied with one side of a hook-and-loop fastener (i.e., hook or loop, or combination) 1406 (which is preferably the opposite of the fastener 1124 provided on the registration rails 1122) may be provided along a length of the sheet material 1402 so as to secure the sheet material 1402 to the registration rails 1122. The sheet material 1402 is preferably a two-direction stretchable material (front to back) or a substantially non-stretchable water resistant or waterproof material, such as a vinyl material in the form of an imitation leather. A front edge of the top material 1402 is secured to the front registration rail 1220. The top 1400 also preferably includes a plurality of support rods 1410 secured to the sheet material 1402 in a direction that is at least substantially perpendicular to the longitudinal direction of the second channels 1120. As the sheet material 1402 is unrolled from a first position (as shown in FIG. 23), the rods 1410 may be supported between the two second channels 1120, either on top of the channels 1120 or in a slot or rail 1412 provided thereon.

Figure 26:
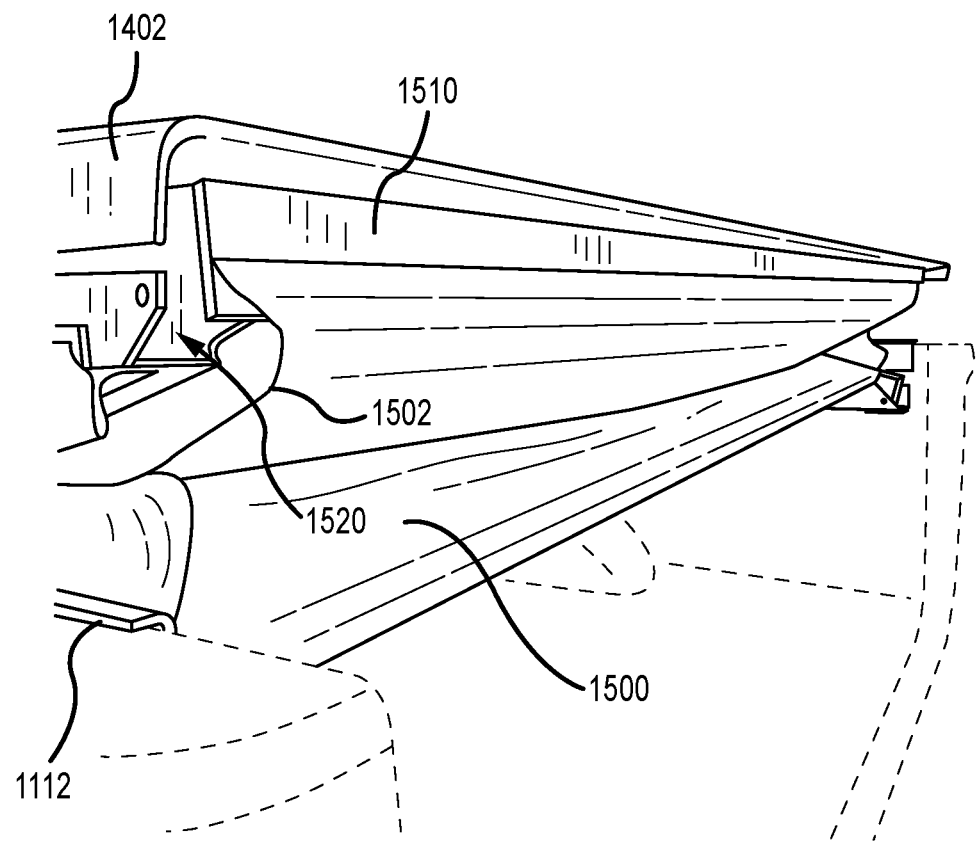
FIG. 26 is a first left rear perspective view of the embodiment of FIG. 23 in a second position.
Figure 27:
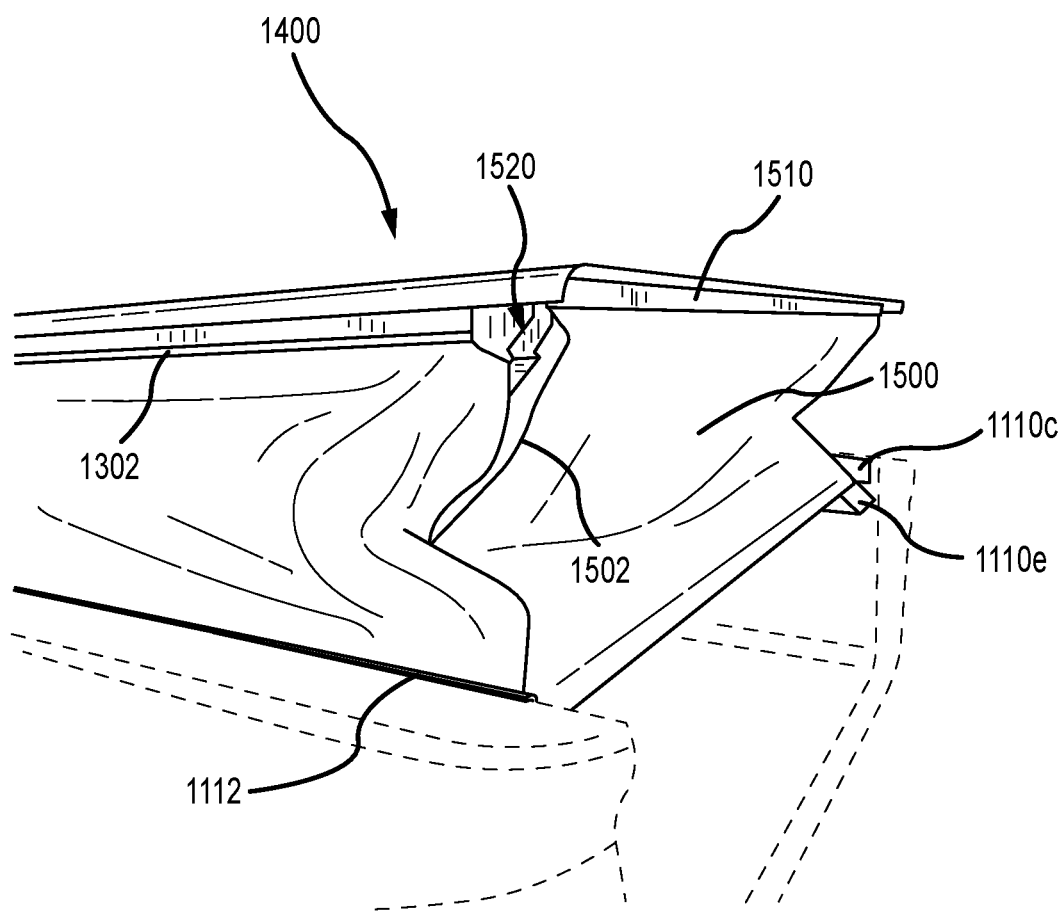
FIG. 27 is a second left rear perspective view of the embodiment of FIG. 23 in a third position.
Figure 28:
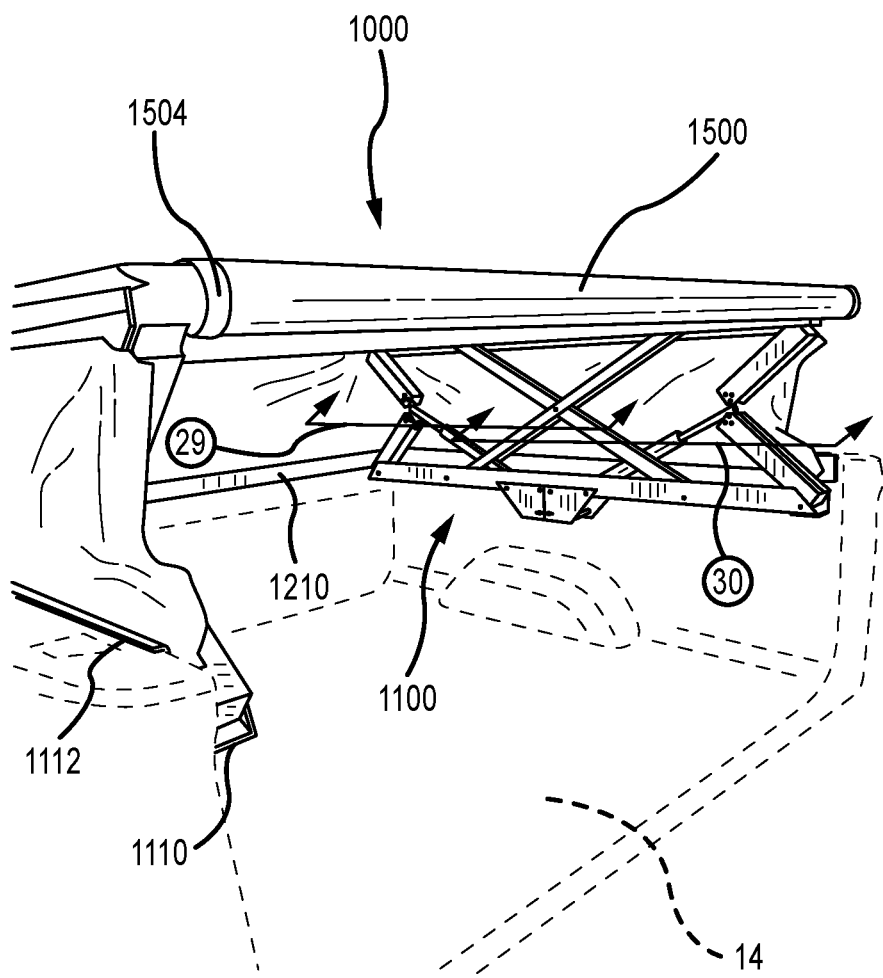
FIG. 28 is a third left rear perspective view of the embodiment of FIG. 27 in the third position.
Figure 29:
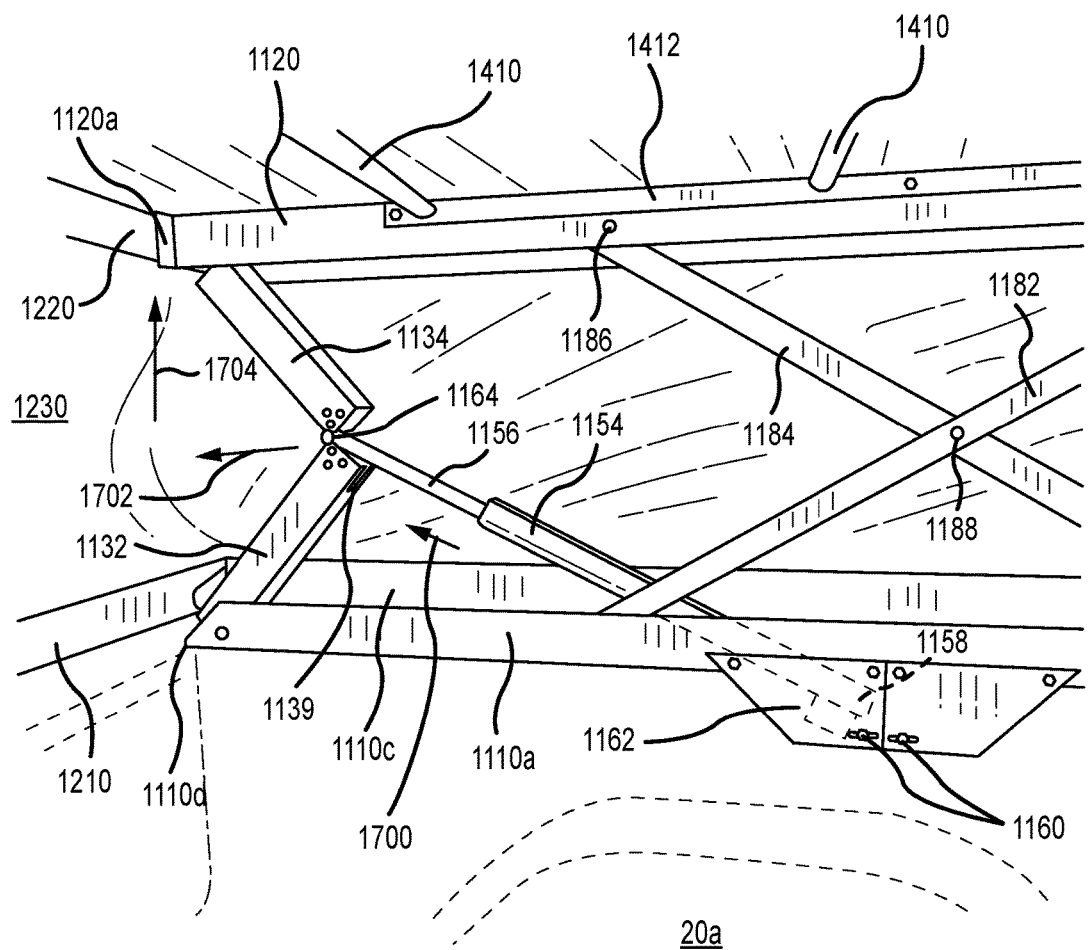
FIG. 29 is a front left side elevation view taken along arrow 29 of FIG. 28.
Figure 30:
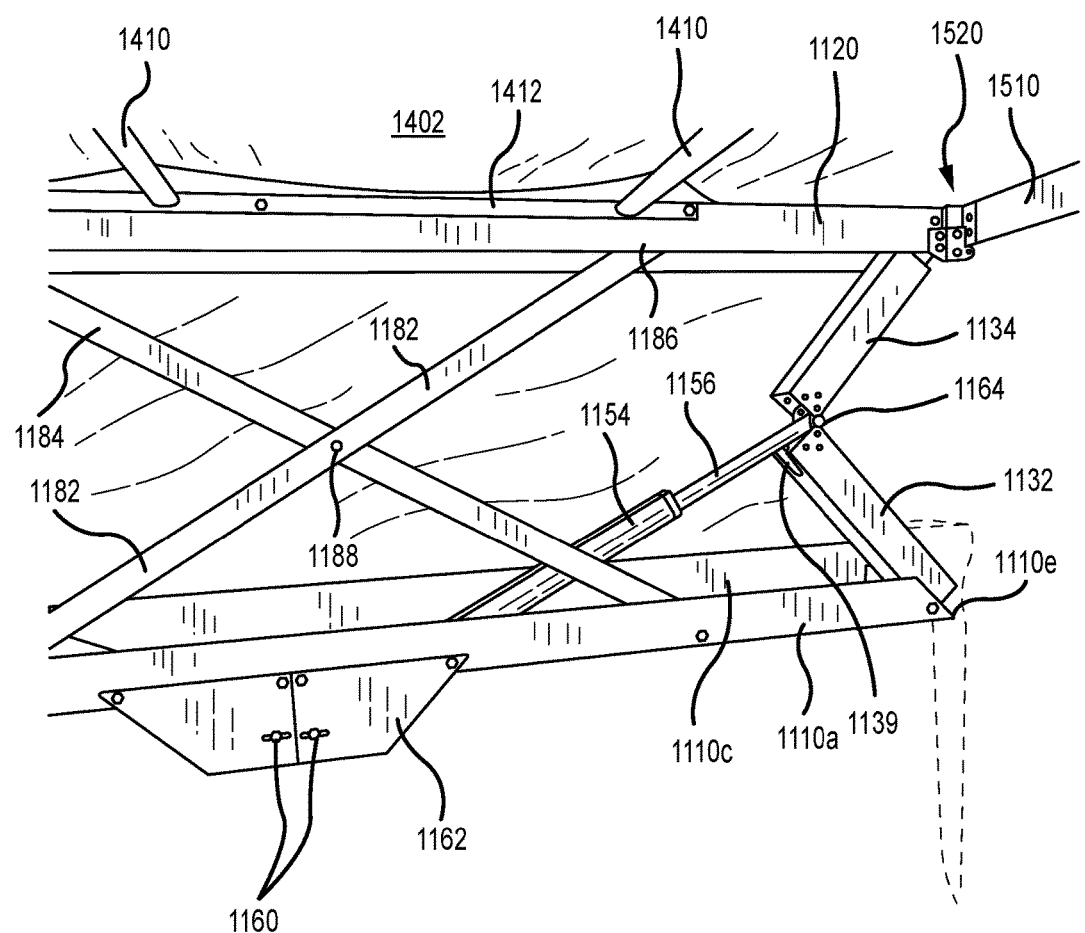
FIG. 30 is a rear left side elevation view taken along arrow 30 of FIG. 28.

The rear panel 1500 is preferably a seamed or seamless continuation of the top sheet material 1402, but may be narrower in width, sufficient to extend between and cover the legs 1132,1134 in the second position, as shown in FIGS. 26, 27, and 31. Along an inner surface of two parallel free edges 1502 of the rear panel 1500 one side of a hook-and-loop fastener (i.e., hook or loop, or combination) 1504 (which is preferably the opposite of the fastener 1138 provided on the leg(s) 1132,1134) may be provided so as provide the ability to secure the panel 1500 to each lower leg 1132 and/or upper leg 1134, as shown. At approximately along the juncture of the rear panel 1500 and the top sheet material 1402, there is provided a rear registration rail 1510 that is selectively securable to one or both top channels 1120 at a clip location 1520. Each clip location 1520 preferably includes a clip plate 1522 including a registration slot 1524 and a registration pin 1526 extending at least substantially perpendicularly from the plate 1522. Accordingly, there is a matching clip secured to one or both ends of the rear registration rail 1510 to cooperate with the clip plate 1522, the clip including a pin (not shown) to cooperate with the registration slot 1524 and a spring-loaded latch to cooperate with and capture the registration pin 1526 to retain the rear registration rail 1520 in position with respect to the top channel 1120. The rear panel 1500 extends along a majority of the total length 1136 of the end rail 1130, thereby allowing unobstructed access through an opening 1530 disposed below a rear panel bottom end 1501 and behind a truck tailgate.

To assemble the fourth embodiment 1000, standard mechanical and electrical principles can be utilized. The longitudinal channels 1110,1120 are extruded or otherwise formed and provided. The end rails 1130 are formed by connecting the end rail legs 1132,1134 at a hinge point and then rotatably connected to the longitudinal channels 1110, 1120. The bearing plates 1162 are secured to the bottom channel 1110 or formed integrally therewith, and the actuator anchor ends 1158 are rotatably mounted thereto. The actuator extension ends 1164 are then rotatably secured to preferably the hinge point between the end rail legs 1132, 1134. The cross-brace 1180 is also inserted if used. Each frame assembly 1100 is then placed along a respective side of the truck box rail 18,22 and secured thereto, such as with panel anchors, adhesive, threaded fasteners, clamping, or welding. The mounting rail 1210 of the front frame assembly 1200 is secured to the front box rail 26, such as with panel anchors, adhesive, threaded fasteners, clamping, or welding. The registration rail 1220 of the front frame assembly 1200 is secured to the first ends 1120a of the top channels 1120, such as by adhesive, threaded fasteners, clamping, or welding. The top 1400 is secured to the front registration rail 1220, and can be rolled up for storage, as seen in FIG. 23. The side panel(s) 1300 and front panel 1230 are then secured between the lower channels 1110 and/or mounting rails 1112,1210 along the lower edge of the panel(s) 1300,1230 and the upper channels 1120 and/or registration rails 1122,1220 along the upper edge of the panel(s) 1300,1230.

Use of the fourth embodiment 1000 may be relatively manual (e.g., if actuation mechanisms 1150 are passively resistive air chambers), but is preferably substantially automated through electric controls, which may be wireless controls. Generally, the actuation mechanisms 1150 may run on electric power (e.g., 12 volts) supplied by a wet cell battery of a vehicle on which the truck box 12 is supported. However, switching of power to the actuation mechanisms 1150 may be undertaken with an on-off-on double pole double throw (DPDT) switch, wherein one pole is electrically coupled to a first actuator supply line for each actuator 1150 and the other pole is electrically coupled to a second actuator supply line for each actuator 1150. The two throw terminals of the DPDT switch associated with each pole can then be respectively electrically coupled to the positive and negative battery voltage on the vehicle. In this way, when the switch is flipped to one of its on positions, it connects a first battery polarity to the actuator supply lines causing the linear actuators to extend. In the OFF switch position, the actuators 1150 are paused or stopped and held in place by the actuators 1150 and/or cross braces 1182,1184. In the other ON switch position, a second battery polarity is connected to the actuator supply lines, causing the linear actuators 1150 to retract, and thus the second channels 1120 to lower towards the first channels 1110 and the side panel(s) 1300 and front panel 1230 to loosen for storage.

More preferably, switch control is provided with a remote control that actuates a solenoid or contactor to control the switching heretofore described. The remote control may be a wired remote control securely mounted inside a cab of a truck, or the remote control may be a wireless remote control including a receiving unit mounted in or on the truck or truck box and a transmitting unit that may be carried in a pocket and/or on a keychain.

Accordingly, the actuators 1150 may be activated to extend the actuation rods 1156 in a first direction 1700 away from the anchor ends 1158 causing the end rails to straighten because of the hinge point being moved in an outward direction 1702, thereby causing the second channel 1120 and front registration rail 1220 to raise in a substantially vertical direction 1704. The actuators 1150 can be operated in reverse to lower the second channels 1120 and front registration rail 1220.

Figure 34:
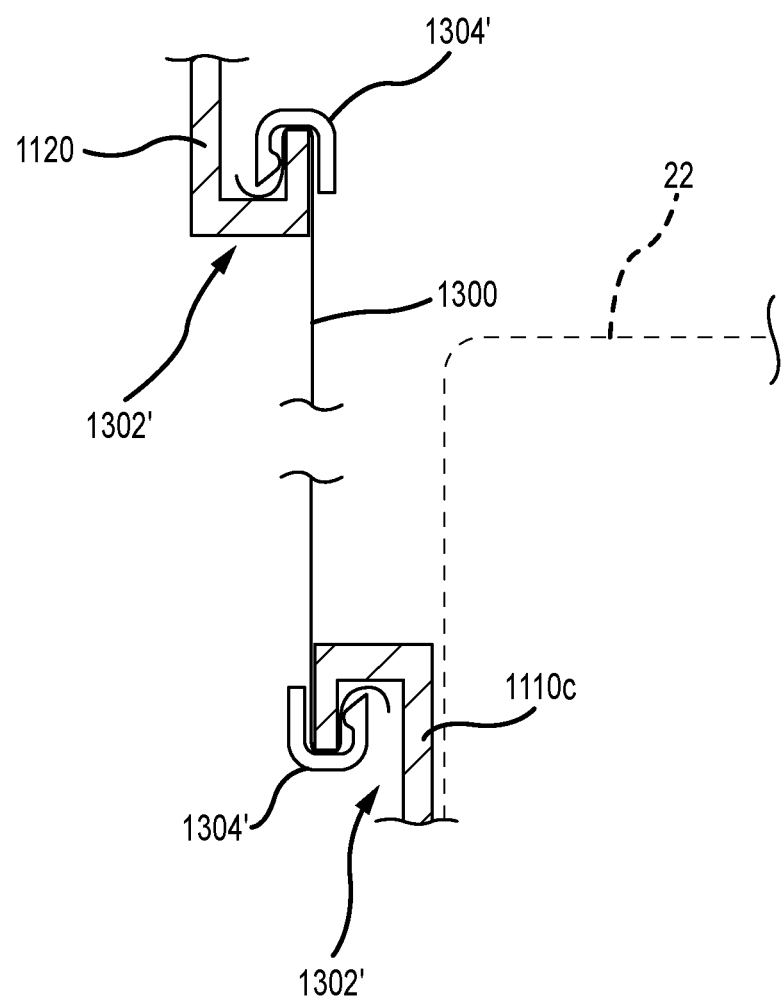
FIG. 34 is an alternative partial cross-section view of channel outer leg members coupled to a side panel.

FIG. 34 provides a partial cross-section view of an alternative system for securing a panel 1300 to the channels 1110,1120. Each channel outer leg (e.g., 1110c) of the channels 1110,1120 may be provided with a longitudinal J-channel 1302', where the open sides of the respective channels are faced away from each other. The panel 1300 may then extend between, and preferably into, each J-channel 1302' and be secured thereto, such as with a U- or J-clip 1304'. A preferred clip 1304' may be an extruded upholstery clip (e.g., polypropylene, 90 Durometer (shore A)) having been cut to a desired width. This Figure also shows an optional lower channel outer leg 1110c that does not include a mounting rail 1112. In this arrangement, the lower channel 1110 may be seated flush or even below the top box rail 22, which can allow the registration rail 1122 on the top channel 1120 to rest directly against the box rail 22 when the channels 1110,1120 are in the closed or retracted position.

Figure 35:
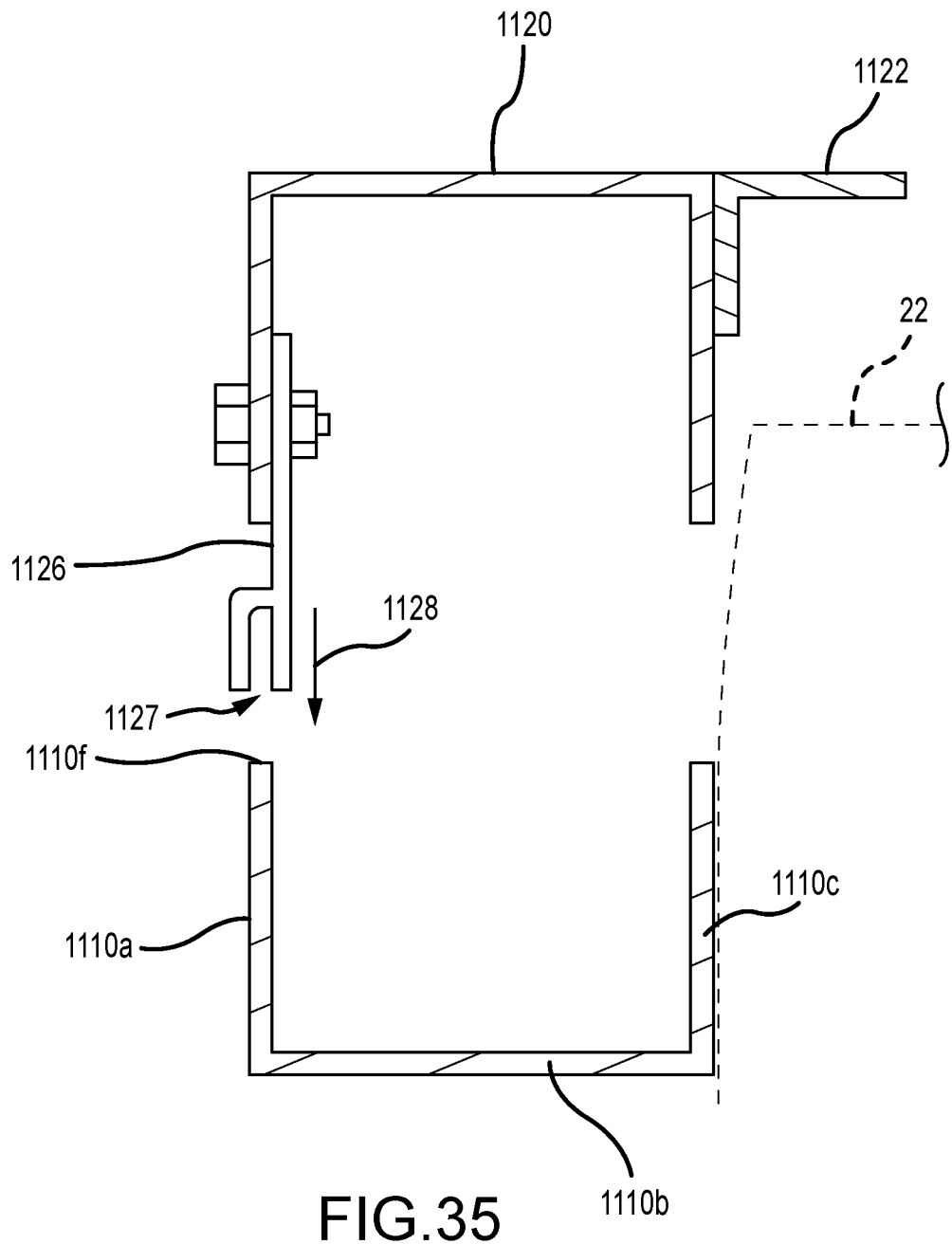
FIG. 35 is a partial cross-section view taken along lines 35-35 in FIG. 32.

FIG. 35 shows a partial cross-section of the channels 1110,1120 taken along line 35-35 on FIG. 32. It has been found that while the lateral stability of the first ends 1120a of the upper channel 1120 is enhanced by the front registration rail 1220, the second ends 1120b of the upper channel 1120 may have a tendency to bow inwardly if the rear registration rail 1510 is not clipped in (i.e., if the back panel 1500 and top 1400 are rolled up towards the front registration rail 1220). Accordingly, an optional alignment clip 1126 may be coupled to or formed integrally with the upper channel 1120. The alignment clip 1126 preferably includes an alignment notch 1127 configured to receive a portion of a top edge 1110f of the inner leg 1110a of the lower channel 1110 as the upper channel 1120 is lowered 1128 into position.

The foregoing is considered as illustrative only of the principles of the invention. Furthermore, because numerous modifications and changes will readily occur to those skilled in the art, it is not desired to limit the invention to the exact construction and operation shown and described. While the preferred embodiment has been described, the details may be changed without departing from the invention, which is defined by the claims.

I claim:

1. A cargo enclosure system comprising:
   two longitudinal frame assemblies, each frame assembly comprising:
   a first longitudinal channel having an open side along at least a majority of a length of the first channel;
   a second longitudinal channel having an open side along at least a majority of a length of the second channel, the open side of the second longitudinal channel being aligned at least substantially parallel to the open side of the first longitudinal channel;
   a first hinged rail disposed proximate a first end of the first and second longitudinal channels,
   a second hinged rail disposed proximate a second end of the first and second longitudinal channels,
   each hinged rail comprising a lower leg and an upper leg, the lower leg including a first end rotatably coupled to the first channel and an opposite second end hingedly coupled to a first end of the upper leg, the upper leg including an opposite second end rotatably coupled to the second channel;
   a first linear actuator having an anchor end rotatably coupled with respect to the first channel and an extension end rotatably coupled with respect to the hinged coupling of the first hinged rail;
   a second linear actuator having an anchor end rotatably coupled with respect to the first channel and an extension end rotatably coupled with respect to the hinged coupling of the second hinged rail,
   the first and second linear actuators being substantially contemporaneously retractable to a first position and extendable from the first position to a second position,
   wherein, when the actuators are in the first position, the first channel and second channel forming a chamber through respective open sides, the chamber containing at least a majority of the first hinged rail and a majority of the second hinged rail, the upper leg of each hinged rail overlapping the lower leg of each hinged rail, and
   wherein, when the actuators are in the second position, the first channel is spaced further from the second channel than in the first position.

2. The cargo enclosure system according to claim 1, wherein when the actuators are in the second position, the upper leg and lower leg are aligned in a coaxial position.

3. The cargo enclosure system according to claim 1, the lower leg of each hinged rail including an actuator rod clearance notch formed in the second end of the lower leg.

4. The cargo enclosure system according to claim 1, wherein the lower channel includes an outer leg having a mounting ledge extending substantially perpendicular to and along a majority of the length of the lower channel.

5. The cargo enclosure system according to claim 1, wherein the upper channel includes a registration ledge extending perpendicular to and along a majority of the length of the upper channel.

6. The cargo enclosure system according to claim 5, wherein the registration ledge is anchored to the upper channel by fasteners.

7. The cargo enclosure system according to claim 1, each linear actuator anchor end being rotatably coupled to a pair of bearing plates secured to the first channel.

8. The cargo enclosure system according to claim 1, further comprising a front frame assembly including a front registration rail secured to both of the two second longitudinal channels and a front mounting rail.

9. The cargo enclosure system according to claim 8, further comprising:
   a top panel including a top sheet material secured to the front registration rail; and
   a plurality of support rods secured to a bottom face of the top sheet material,
   wherein the support rods are configured to span an entire distance between the two second longitudinal channels.

10. The cargo enclosure system according to claim 1, further comprising a first side panel coupled to and extending between the first channel and the second channel of one of the two frame assemblies.

11. The cargo enclosure system according to claim 10, further comprising a second side panel coupled to and extending between the first channel and the second channel of the other of the two frame assemblies.

12. The cargo enclosure system according to claim 11, further comprising a third side panel coupled to and extending between the first rail and the second rail of the front frame assembly.

13. The cargo enclosure system according to claim 12, wherein the first side panel, the second side panel, and the third side panel form a continuous three-sided perimeter when the frame assemblies are in the extended position.

14. The cargo enclosure system according to claim 13, wherein the first side panel, the second side panel, and the third side panel are formed from a contiguous sheet of material.

15. The cargo enclosure system according to claim 14, wherein the material is pliable and at least partially elastic.

* * * * *